United States Patent

Kühlthau

[11] 4,039,539
[45] Aug. 2, 1977

[54] 1,2,4-TRIAZOLE-AZO-ANILINE CATIONIC DYESTUFFS

[75] Inventor: Hans-Peter Kühlthau, Leverkusen, Germany

[73] Assignee: Bayer Aktiengesellschaft, Leverkusen, Germany

[21] Appl. No.: 598,272

[22] Filed: July 23, 1975

[30] Foreign Application Priority Data

Aug. 3, 1974 Germany ............................ 2437549

[51] Int. Cl.² ..................... C09B 29/08; C09B 29/26; D06P 1/08; D06P 1/10
[52] U.S. Cl. ............................. 260/157; 260/146 R; 260/156; 260/308 R; 260/463
[58] Field of Search ........................... 260/157, 146 R

[56] References Cited
U.S. PATENT DOCUMENTS

| | | |
|---|---|---|
| 3,007,915 | 11/1961 | Merian ................. 260/158 |
| 3,519,615 | 7/1970 | Wolfrum et al. .......... 260/155 |
| 3,763,140 | 10/1973 | Entschel et al. ......... 260/158 |
| 3,770,716 | 11/1973 | Ozutsumi et al. ........ 260/146 R |
| 3,821,194 | 6/1974 | Peter et al. ............. 260/158 X |

Primary Examiner—Floyd D. Higel
Attorney, Agent, or Firm—Plumley and Tyner

[57] ABSTRACT

Cationic dyestuffs of the formula

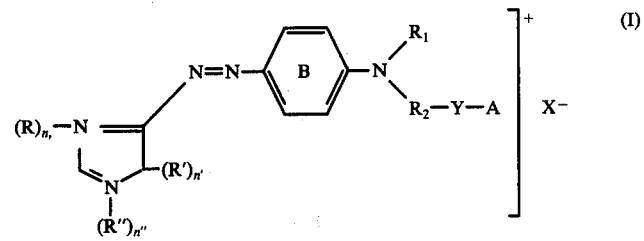

in which
R, R' and R'' denote alkyl, alkenyl, cycloalkyl or aralkyl and
$R_1$ denotes hydrogen, alkyl, alkenyl, cycloalkyl or aralkyl or
$R_1$ can form a five-membered or six-membered heterocyclic ring with the ring B,
$R_2$ denotes an alkylene group of which the chain can be interrupted by O,
Y denotes a —CO— or —O—CO—O— group,
A denotes an aromatic ring and
$X^-$ denotes an anion, and
$n$, $n'$ and $n''$ independently of one another are 0 or 1, with the proviso that the sum $n + n' + n''$ is 2, are suitable for dyeing and printing of natural and synthetic materials with good fastness properties with respect to light, wet processing, rubbing, decatizing, sublimation and perspiration.

10 Claims, No Drawings

1,2,4-TRIAZOLE-AZO-ANILINE CATIONIC DYESTUFFS

The invention relates to new cationic dyestuffs of the general formula

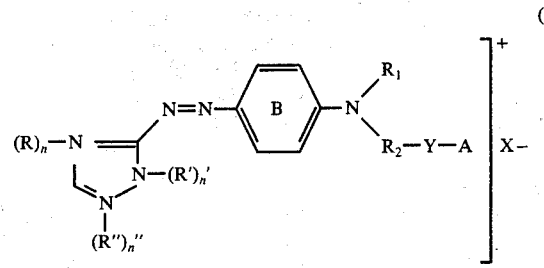

in which
- R, R' and R" independently of one another denote alkyl, alkenyl, cycloalkyl or aralkyl and
- $R_1$ denotes hydrogen, alkyl, alkenyl, cycloalkyl or aralkyl or
- $R_1$ can form a five-membered or six-membered heterocyclic ring with the ring B,
- $R_2$ denotes an alkylene group of which the chain can be interrupted by O,
- Y denotes a —CO— or —O—CO—O— group,
- A denotes an aromatic ring and
- $X^-$ denotes an anion, and
- $n$, $n'$ and $n''$ independently of one another ar 0 or 1, with the proviso that the sum $n + n' + n''$ is 2, and in which
the cyclic and acyclic radicals can contain non-ionic substituents and/or a carboxyl group, and the rings A and B can be fused to optionally non-ionically sustituted carbocyclic or heterocyclic rings, and also to processes for the preparation of these cationic dyestuffs, and the use of the dyestuffs for dyeing, printing and bulk dyeing of natural and synthetic materials.

The following may be mentioned as examples of R, R', R" and $R_1$:

As alkyl radicals, above all $C_1$-$C_6$-alkyl radicals, such as the methyl, ethyl, n- and i-propyl, n-, sec- and t-butyl radical and the n- and i-amyl and n-hexyl radical, as well as $C_1$-$C_6$-alkyl radicals substituted by the carboxyl group or by non-ionic substituents, such as by halogen atoms or by hydroxyl, $C_1$-$C_4$-alkoxy, cyano, $C_1$-$C_4$-alkoxycarbonyl or carboxylic acid amide groups, such as the 2-chloroethyl, 2-bromomethyl, 2-hydroxyethyl, 2-methoxyethyl, 2-cyanoethyl, 2-acetoxyethyl, 2-carbonamido-ethyl, 2-carboxyethyl, 2-methoxycarbonylethyl, 2-ethoxycarbonylethyl, 2-hydroxypropyl-(1), 3-cyanopropyl, 2-hydroxy-n-propyl, 2-hydroxy-n-butyl, 2-hydroxy-i-butyl, 2-hydroxy-3-allyloxy-n-propyl and 3-methoxycarbonyl-n-butyl radical.

As alkenyl radicals, above all $C_2$-$C_6$-alkenyl radicals, such as the vinyl, allyl or methallyl radical, and their derivatives substituted by non-ionic radicals such as halogen, for instance the 2-chloroalkyl radical.

As cycloalkyl radicals, above all the cyclopentyl and cyclohexyl radical and their derivatives substituted by non-ionic substitutents, such as halogen atoms or $C_1$-$C_6$-alkyl groups, such as the 4-chlorocyclohexyl radical and the dimethylcyclohexyl radical.

As aralkyl radicals, above all the benzyl, 2-phenylethyl, β-phenyl-β-hydroxyethyl and 2-phenylpropyl-(2) radical and their derivatives substituted in the phenyl nucleus by non-ionic groups or atoms, such as halogen or $C_1$-$C_6$-alkyl, such as the 4-chlorobenzyl and 3-methylbenzyl radical.

Possible alkylene groups $R_2$ are $C_1$-$C_6$-alkylene groups, especially the methylene, ethylene, 1,3-propylene, 1,2-propylene and 1.4-butylene groups. These groups can also contain an ether oxygen in the chain.

A preferably represents a phenyl, naphthalene or tetrahydronaphthalene radical and their derivatives substituted by the non-ionic groups or atoms.

Examples of preferred substituents of the ring A are $C_1$-$C_{12}$-alkyl, $C_1$-$C_6$-alkoxy, halogen, $C_1$-$C_4$-alkoxycarbonyl, phenyl, benzyl, 2-phenylethyl, 2-phenylpropyl, cyclohexyl, $C_1$-$C_4$-alkylsulphonyl or phenylsulphonyl.

As five-membered or six-membered heterocyclic rings which $R_1$ can form with ring B there may above all be mentioned the pyrroline and tetrahydropyridine ring and their derivatives substituted by $C_1$-$C_4$-alkyl radicals, such as the 2-methylpyrrolidine and 2,2,4-trimethyltetrahydropyridine ring.

Examples of preferred substituents of the ring B are halogen, $C_1$-$C_6$-alkyl, trifluoromethyl, $C_1$-$C_4$-alkoxy, phenyloxy, benzyloxy, benzyl, cyano, $C_1$-$C_3$-alkylcarbonylamino, benzoylamino, $C_1$-$C_3$-sulphonylamino, phenylsulphonylamino, $C_1$-$C_3$-alkoxycarbonyloxy, benzoyloxy or $C_1$-$C_4$-alkylsulphonyl.

By non-ionic substituents there are understood, in the sense of the present invention, the substituents which are customary in dyestuff chemistry and do not dissociate under the reaction conditions in question, such as halogen, for example fluorine, chlorine and bromine; nitro, cyano, formyl, ureido, aminocarbonyl, aminosulphonyl; the following radicals, containing alkyl groups, in which the alkyl groups mentioned preferably possess 1-4 C atoms: alkoxy, alkylthio, alkoxycarbonyl, alkylcarbonyl, alkylcarbonyloxy, alkoxycarbonyloxy, alkylcarbonylamino, alkylaminocarbonyloxy, alkylsulphonylamino, alkylureido, alkoxycarbonylamino, alkylaminocarbonyl, dialkylaminocarbonyl, N-alkyl-N-aryl aminocarbonyl, wherein the aryl group preferably represents a phenyl group, alkylaminosulphonyl, dialkylaminosulphonyl, alkylsulphonyl, alkoxysulphonyl or alkylsulphonylalkylamino; further, aryl, and radicals containing aryl groups, in which the aryl radical preferably denotes phenyl or naphthyl, such as aryloxy, aryloxyalkoxy, arylthio, arylcarbonyl, arylcarbonyloxy, arylcarbonylamino, arylaminocarbonyloxy, arylsulphonylamino, arylsulphonylalkylamino, arylureido, aryloxycarbonylamino, arylsulphonyl, aryloxycarbonyl or aryloxysulphonyl; radicals containing aralkyl groups, in which the aralkyl groups preferably denote benzyl or phenylethyl, such as aralkoxy, aralkylthio, aralkylcarbonyl, aralkylsulphonyl or aralkoxycarbonyl; and cycloalkyl, or radicals containing cycloalkyl groups, in which the cycloalkyl group preferably represents a cyclopentyl or cyclohexyl radical, such as cycloalkoxy. The aryl and cycloalkyl radicals can in turn be substituted, preferably by halogen or $C_1$-$C_6$-alkyl radicals. Further possible non-ionic substituents bonded to a cyclic radical are alkyl with, preferably, 1-12 C atoms or aralkyl haing the abovementioned preferred definition.

Possible anionic radicals $X^-$ are the organic and inorganic anions which are customary for cationic dyestuffs.

Examples of inorganic anions are fluoride, chloride, bromide and iodide, perchlorate, hydroxyl, radicals of acids containing S, such as bisulphate, sulphate, disulphate and aminosulphate; radicals of nitrogen-oxygen acids, such as nitrate; radicals of oxygen acids of phosphorus, such as dihydrogen phosphate, hydrogen phosphate, phosphate and metaphosphate; radicals or carbonic acid, such as bicarbonate and carbonate; further anions of oxygen acids and complex acids, such as methosulphate, ethosulphate, hexafluosilicate, cyanate, thiocyanate, ferrocyanide, ferricyanide, trichlorozincate and tetrachlorozincate, tribromozincate and tetrabromozincate, stannate, borate, divanadate, tetravanadate, molybdate, tungstate, chromate, bichromate and tetrafluoborate, as well as anions of esters of boric acid, such as of the glycerol ester of boric acid, and of esters of phosphoric acid, such as of methyl phosphate.

Examples of organic anions are anions of saturated or unsaturated aliphatic, cycloaliphatic, aromatic and heterocyclic carboxylic acids and sulphonic acids, such as radicals of acetic acid, chloroacetic acid, cyanoacetic acid, hydroxyacetic acid, aminoacetic acid, methylaminoacetic acid, aminoethylsulphonic acid, methylaminoethylsulphonic acid, propionic acid, n-butyric acid, i-butyric acid, 2-methyl-butyric acid, 2-ethylbutyric acid, dichloroacetic acid, trichloroacetic acid, trifluoroacetic acid, 2-chloropropionic acid, 3-chloropropionic acid, 2-chlorobutyric acid, 2-hydroxypropionic acid, 3-hydroxypropionic acid, 0-ethylglycollic acid, thioglycollic acid, glyceric acid, malic acid, dodecyl-tetraethylene glycol-ether-propionic acid, 3-(nonyloxy)-propionic acid, 3-(isotridecyloxy)-propionic acid, 3-(isotridecyloxy)-diethylene glycol-ether-propionic acid, the ether-propionic acid of the alcohol mixture with 6 to 10 carbon atoms, thioacetic acid, 6-benzoylamino-2-chlorocaproic acid, nonlyphenol-tetraethylene glycol-ether-propionic acid, nonlyphenoldiethylene glycol-ether-propionic acid, dodecyl-tetraethylene glycol-ether-propionic acid, phenoxyacetic acid, nonylphenoxyacetic acid, n-valeric acid, i-valeric acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9 to 11 carbon atoms (Versatic Acid 911 from SHELL), a mixture of aliphatic carboxylic acids with 15 to 19 carbon atoms (Versatic Acid 1519 from SHELL), coconut fatty acid first runnings, undecanecarboxylic acid, n-tridecanecarboxylic acid and a coconut fatty acid mixture; acrylic acid, methacrylic acid, crotonic acid, propargylic acid, oxalic acid, malonic acid, succinic acid, glutaric acid, adipic acid, pimelic acid, suberic acid, azelaic acid, the isomer mixture of 2,2,4- and 2,4,4-trimethyladipic acid, sebacic acid, isosebacic acid (isomer mixture), tartaric acid, citric acid, glyoxylic acid, dimethyl ether-$\alpha,\alpha'$-dicarboxylic acid, methylene-bis-thioglycollic acid, dimethyl sulphide-$\alpha,\alpha'$-dicarboxylic acid, 2,2'-dithio-di-n-propionic acid, fumaric acid, maleic acid, itaconic acid, ethylene-bis-iminoacetic acid, nitrilosulphonic acid, methanesulphonic acid, ethanesulphonic acid, chloromethanesulphonic acid, 2-chloro-ethanesulphonic acid and 2-hydroxyethanesulphonic acid and Mersolat, that is to say $C_8$-$C_{15}$ paraffinsulphonic acid, obtained by hydrolysis of the sulpho-chlorination products of the corresponding n-paraffins.

Examples of suitable anions of cycloaliphatic carboxylic acids are the anions of cyclohexanecarboxylic acid and cyclohexene-3-carboxylic acid and examples of anions of araliphatic monocarboxylic acids are anions of phenylacetic acid, 4-methylphenylacetic acid and mandelic acid.

Suitable anions of aromatic carboxylic acids are, for example, the anions of benzoic acid, 2-methylbenzoic acid, 3-methylbenzoic acid, 4-methylbenzoic acid, 4-tert.-butylbenzoic acid, 2-bromobenzoic acid, 2-chlorobenzoic acid, 3-chlorobenzoic acid, 4-chlorobenzoic acid, 2,4-dichlorobenzoic acid, 2,5-dichlorobenzoic acid, 2-nitrobenzoic acid, 3-nitrobenzoic acid, 4-nitrobenzoic acid, 2-chloro-4-nitrobenzoic acid, 6-chloro-3-nitrobenzoic acid, 2,4-dinitrobenzoic acid, 3,4-dinitrobenzoic acid, 3,5-dinitrobenzoic acid, 2-hydroxybenzoic acid, 3-hydroxybenzoic acid, 4-hydroxybenzoic acid, 2-mercaptobenozic acid, 4-nitro-3-methylbenzoic acid, 4-aminobenzoic acid, 5-nitro-2-hydroxybenzoic acid, 3-nitro-2-hydroxybenzoic acid, 4-methoxybenzoic acid, 3-nitro-4-methoxybenzoic acid, 4-chloro-3-hydroxybenzoic acid, 3-chloro-4-hydroxybenzoic acid, 5-chloro-2-hydroxy-3-methylbenzoic acid, 4-ethylmercapto-2-chlorobenzoic acid, 2-hydroxy-3-methylbenzoic acid, 6-hydroxy-3-methylbenzoic acid, 2-hydroxy-4-methylbenzoic acid, 6-hydroxy-2,4-dimethylbenzoic acid, 6-hydroxy-3-tert.-butyl-benzoic acid, phthalic acid, tetrachlorophthalic acid, 4-hydroxyphthalic acid, 4-methoxyphthalic acid, isophthalic acid, 4-chloroisophthalic acid, 5-nitro-isophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthalene-1,4,5,8-tetracarboxylic acid, biphenyl-4-carboxylic acid, abietic acid, phthalic acid mono-n-butyl ester, terephthalic acid monomethyl ester, 3-hydroxy-5,6,7,8-tetrahydronaphthalene-2-carboxylic acid, 2-hydroxy-1-naphthoic acid and anthraquinone-2-carboyxlic acid.

Examples of suitable anions of heterocyclic carboxylic acids are the anions of pyromucic acid, dehydromucic acid and indolyl-3-acetic acid.

Examples of suitable anions of aromatic sulphonic acids are the anions of benzenesulphonic acid, benzene-1,3-disulphonic acid, 4-chlorobenzenesulphonic acid, 3-nitrobenzenesulphonic acid, 6-chloro-3-nitrobenzenesulphonic acid, toluene-4-sulphonic acid, toluene-2-sulphonic acid, toluene-$\omega$-sulphonic acid, 2-chlorotoluene-4-sulphonic acid, 2-hydroxybenzenesulphonic acid, n-dodecylbenzenesulphonic acid, 1,2,3,4-tetrahydronaphathalene- -sulphonic acid, napthalene-1-sulphonic acid, napthalene-1,4- or -1,5-disulphonic acid, naphthalene-1,3,5-trisulphonic acid, 1-naphthol-2-sulphonic acid, 5-nitronaphthalene-2-sulphonic acid, 8-aminonaphthalene-1-sulphonic acid, stilbene-2,2'-disulphonic acid and biphenyl-2-sulphonic acid.

An example of a suitable anion of heterocyclic sulphonic acids in the anion of quinoline-5-sulphonic acid.

Further anions which can be used are those of arylsulphinic, arylphosphonic and arylphosphonous acids, such as benzenesulphinic acid and benzenephosphonic acid.

Colourless anions which do not excessively lower the solubility of the cationic compounds in water are preferred.

The anion is in general decided by the manufacturing process and by the purification of the cationic compounds which may have been carried out. In general the cationic compounds are in the form of halides (especially chlorides or bromides) or methosulphates, ethosulphates, sulphates, benzenesulphonates or toluenesulphonates, or acetates. These anions can be replaced by other anions in a known manner.

Preferred dyestuffs of the formula I are those which correspond to the general formula

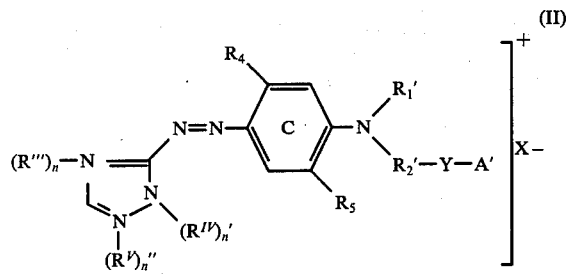

(II)

in which

Y, $n$, $n'$, $n''$ and $X^-$ have the same meaning as in the formula I and $R'''$, $R^{IV}$ and $R^V$ independently of one another represent $C_1$-$C_6$-alkyl, $C_2$-$C_7$-alkenyl, benzyl, cyclohexyl or phenylethyl, which are optionally substituted by halogen, hydroxyl, cyano, $C_1$-$C_4$-alkylcarbonyloxy, $C_1$-$C_4$-alkoxycarbonyl, hydroxycarbonyl or aminocarbonyl, or represent the radical

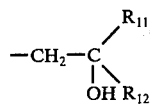

wherein $R_{11}$ denotes hydrogen or methyl and
$R_{12}$ denotes methyl, ethyl, halogen-, $C_1$-$C_4$-alkoxy-, $C_2$-$C_4$-alkenyloxy- or phenoxy-substituted methyl or phenyl,
$R_1'$ represents hydrogen or $C_1$-$C_6$-alkyl optionally substituted by halogen, hydroxyl, $C_1$-$C_4$-alkoxy, cyano, acetoxy, hydroxycabonyl, $C_1$-$C_4$-alkoxycarnonyl, $C_1$-$C_4$-alkoxycarbonyloxy, aminocarbonyl, $C_1$-$C_4$-alkylsulphonylamino or $C_1$-$C_4$-alkylsulphonyl-$C_1$-$C_4$-alkylamino; $C_2$-$C_7$-alkenyl; or cyclopentyl, cyclohexyl, benzyl or $\beta$-phenylethyl which are optionally substituted by $C_1$-$C_6$-alkyl,
$R_2'$ represents a $C_1$-$C_6$ straight-chain or branched alkylene group of which the C chain can be interrupted by O and can be substituted by $C_1$-$C_4$-alkoxy, $C_2$-$C_4$-alkenyloxy, phenyl or phenoxy,
$R_4$ represents hydrogen, halogen, optionally halogen-substituted $C_1$-$C_6$-alkyl, $C_1$-$C_4$-alkoxy, benzyl or $\beta$-phenylethoxy which are optionally substituted in the phenyl ring by $C_1$-$C_6$-alkyl, cyano, phenoxy or naphthyloxy which are optionally substituted by $C_1$-$C_6$-alkyl or halogen, $C_1$-$C_4$-alkylcarbonylamino or $C_1$-$C_4$-alkylsulphonylamino, phenylcarbonylamino or phenylsulphonylamino, $C_1$-$C_4$-alkylcarbonyloxy or phenylcarbonyloxy or, together with C, a naphthalene or tetralin ring,
$R_5$ represents hydrogen, $C_1$-$C_6$-alkyl, $C_1$-$C_4$-alkoxy, benzyloxy or $\beta$-phenylethoxy which are optionally substituted in the phenyl ring by $C_1$-$C_6$-alkyl, phenoxy or naphthyloxy which are optionally substituted by $C_1$-$C_6$-alkyl or halogen, $C_1$-$C_4$-alkylcarbonylamino or $C_1$-$C_4$-alkylsulphonylamino, phenylcarbonylamino or phenylsulphonylamino, $C_1$-$C_4$-alkylcarbonyloxy or phenylcarbonyloxy or, together with C, a naphthalene or tetralin ring and
$A'$ represents a radical of the benzene, naphthalene or tetrahydronaphthalene series which can be substituted by $C_1$-$C_4$-alkyl, $C_1$-$C_4$-alkoxy, halogen, phenyl, cyclohexyl, $C_1$-$C_4$-alkoxycarbonyl, benzyl, $C_1$-$C_4$-alkylsulphonyl or phenylsulphonyl, it being possible for the cylic radical mentioned in turn to be substituted by halogen, $C_1$-$C_4$-alkyl or $C_1$-$C_4$-alkoxy.

Amongst the dyestuffs of the formula II, the dyestuffs of the formulae III and IV indicated below are of particular importance:

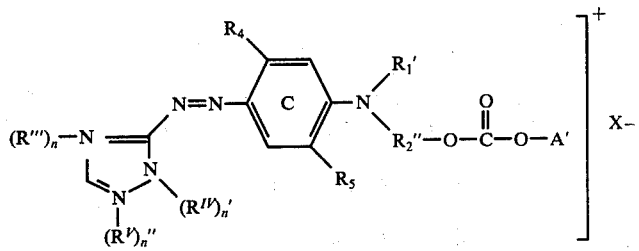

(III)

in which $R'''$, $R^{IV}$, $R^V$, $R_1'$, $R_4$, $R_5$, $A'$, $X^-$, $n$, $n'$ and $n''$ have the meaning indicated under formula II and
$R_2''$ represents the groups

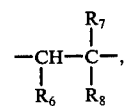

—$(CH_2)_p$— or —$(CH_2)_p$—O—$CH_2$—$CH_2$— in which $R_6$ denotes hydrogen, methyl, ethyl, methoxymethyl, ethoxymethyl, propoxymethyl, butoxymethyl, allyloxymethyl, phenyl or phenoxymethyl,
$R_7$ denotes hydrogen, methyl, ethyl, butoxymethyl, methoxymethyl, ethoxymethyl, propoxymethyl, allyloxymethyl, phenyl, phenoxymethyl or —O—CO—O—$A'$,
$R_8$ denotes hydrogen or methyl and
$p$ denotes a number from 1 to 6.

Under formula III, dyestuffs to be singled out are those in which
$R'''$, $R^{IV}$, and $R^V$ independently of one another represent methyl, ethyl or benzyl,
$R_5$ represents hydrogen, $R_4$ represents hydrogen, $C_1$-$C_4$-alkyl, $C_1$-$C_4$-alkoxy, chlorine or bromine,
$R_2''$ represents $-(CH_2)_p-$ or $-(CH_2)_p-O-C_2H_4-$ and
p represents 2, 3 or 4,
the dyestuffs of the greatest importance being those in which
$R'''$, $R^{IV}$ and $R^V$ represent methyl,
$R_4$ represents hydrogen, methoxy, chlorine or methyl and
p represents 2.

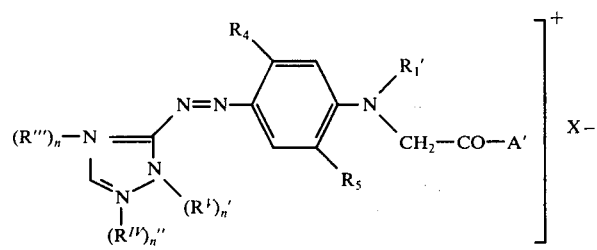

(IV)

in which
$R'''$, $R^{IV}$, $R^V$, $R_1'$, $R_4$, $R_5$, A', $X^-$, n' and n'' have the meaning indicated under formula II.

Under formula IV, dyestuffs to be singled out particularly are those in which
$R'''$, $R^{IV}$ and $R^V$ independently of one another represent methyl, ethyl or benzyl,
$R_5$ represents hydrogen and
$R_4$ represents hydrogen, $C_1$-$C_4$-alkyl, $C_1$-$C_4$-alkoxy, chlorine or bromine,
the dyestuffs of the greatest importance being those in which
$R'''$, $R^V$ and $R^V$ represent methyl and
$R_4$ represents hydrogen, methoxy, chlorine or methyl.

The dyestuffs of the formula I are prepared by the action of quaternising agents, which are able to donate or form the radicals, R, R' and R'', on azo compounds of the formula

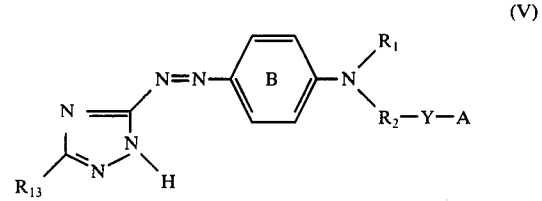

(V)

in which
$R_1$, $R_2$, A, B and Y have the meaning indicated under formula I and
$R_{13}$ represents hydrogen or the carboxyl group,
and in particular, at least 2 mols, preferably 2 to 2.5 mols, of quaternising agent are employed per mol of the azo compound of the formula I. During the quaternisation, both the substitution of the hydrogen atom bonded to the triazole nitrogen, and a quaternisation of a triazole nitrogen take place. The reaction of the azo compounds of the formula V with the quaternising agents is carried out in the manner customary for quaternisation reactions. In this reaction, azo dyestuffs of the formula V, in which $R_{13}$ represents carboxyl
also give dyestuffs of the formula I, since during the quaternisation, frequently already at the beginning of the reaction, a spontaneous decarboxylation takes place.

The quaternising agents to be used can be divided into three groups:

1. Quaternising agents which react with splitting off of R, R' or R'' and an anionic radical, for example quaternising agents of the formulae $$R-X, R'-X \text{ and } R''-X \qquad (VI)$$

in which
R, R' and R'' have the meaning indicated under formula I and
X represents a radical which can be split off as an anion.

These quaternising agents are used at temperatures of 0° to 100° C, preferably 5° to 90° C, if appropriate in the presence of acid-binding compounds, such as alkaline earth metal oxides, for example magnesium oxide or calcium oxide, alkali metal carbonates or alkaline earth metal carbonates, for example sodium bicarbonate, sodium carbonate, potassium carbonate or calcium carbonate, or acetates, for example sodium acetate or potassium acetate, and if appropriate in diluents which are substantially inert under the reaction conditions, such as water or organic solvents, for example hydrocarbons, such as benzene, nitrobenzene, toluene or xylene; halogenohydrocarbons, such as chloroform, carbon tetrachloride, tetrachloroethylene, chlorobenzene or dichlorobenzene, aliphatic ketones, for example acetone or methyl ethyl ketone, or dimethylformamide, acetonitrile, glacial acetic acid, formic acid and alcohols, for example ethanol, propanol or butanol.

The following may be mentioned as examples of representatives of these quaternising agents: alkyl halides, such as methyl iodide, ethyl bromide, butyl chloride, 2-bromopropionic acid amide, chloroacetic acid ethyl ester, chloroacetic acid amide or 2-bromopropionitrile; alkenyl halides, such as allyl chloride, allyl bromide or methallyl bromide; cycloalkyl halides, such as cyclohexyl bromide; aralkyl halides, such as benzyl chloride or 4-methylbenzyl bromide; alkyl sulphates, such as dimethyl sulphate or diethyl sulphate; arylsulphonic acid alkyl esters, such as toluenesulphonic acid methyl ester, ethyl ester, n-propyl ester, 2-chloroethyl ester or 2-cyanoethyl ester.

2. Quaternising agents which form the radicals R, R' or R'' by addition in the presence of an acid which forms the anion $X^-$.

These quaternising agents include, for example, unsaturated compounds, which have an activating group in the position adjacent to the double bond, such as acrylic acid and methacrylic acid and their derivatives, for example esters, such as acrylic acid methyl ester and methacrylic acid methyl ester; amides, such as acrylic acid amide, N-methyl-acrylic acid amide and methacrylic acid amide; or nitriles, such as acrylonitrile and methacrylonitrile.

These unsaturated compounds are reacted with the azo dyestuffs of the formula V at temperatures of 50° to 100° C in the presence of an organic or inorganic acid which provides the anion X⁻, for example formic acid, acetic acid or hydrochloric acid, optionally in an organic solvent which is inert under the reaction conditions, such as benzene, toluene, xylene, chlorobenzene or dichlorobenzene, nitrobenzene, dioxane, chloroform, dimethylformamide or N-methylpyrrolidone.

Further, the quaternising agents of type (2) include epoxides of the formula

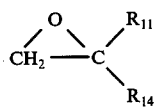
(VII)

in which
R$_{11}$ represents hydrogen or methyl and
R$_{14}$ represents hydrogen, methyl, ethyl, chloromethyl, methoxymethyl, ethoxymethyl, propoxymethyl, butoxymethyl, allyloxymethyl, phenoxymethyl or phenyl.

These epoxy compounds are reacted with the azo compounds of the formula V, in the presence of a solvent and of an organic or inorganic acid which provides the anion X⁻, at temperatures of 10° to 100° C, preferably at 40° to 90° C. Examples of suitable acids are sulphuric acid, phosphoric acid, hydrochloric acid, hydrogen bromide, benzenesulphonic acid, toluenesulphonic acid, formic acid, acetic acid and propionic acid, and the liquid carboxylic acids can simultaneously serve as solvents. Further examples of suitable solvents are dimethylformamide, acetonitrile, dioxane, tetrahydrofurane, halogenobenzenes, benzene hydrocarbons, nitrobenzene, dialkyl ketones and the like.

The compounds of the formula V are obtained in a manner which is in itself known by diazotisation of 3-amino-1,2,4-triazole or 3-amino-1,2,4-triazole-5-carboxylic acid and coupling of the diazonium compound to compounds of the formula

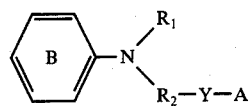
(VIII)

in which
R$_1$, R$_2$, A, B and Y have the meaning indicated under formula I.

Examples of suitable coupling components of the formula VIII are: N-β-phenoxy-carbonyloxy-ethyl-N-ethylaniline, N-β-(β'-phenoxy-carbonyloxy-ethoxy)-ethyl-N-ethylaniline, N-γ-(phenoxy-carbonyloxy)-propyl-N-ethylaniline, N-β-(p-chlorophenoxy-carbonyloxy)-ethyl-N-ethylaniline, N-β-(o-chlorophenoxy-carbonyloxy)-ethyl-N-ethylaniline, N-β-(p-methyl-phenoxy-carbonyloxy)-ethyl-N-ethylaniline, N-β-(o-methylphenoxy-carbonyloxy)-ethyl-N-ethylaniline, N-β-(p-ethylphenoxy-carbonyloxy)-ethyl-N-ethylaniline, N-β-(o-ethylphenoxy-carbonyloxy)-ethyl-N-ethylaniline, N-β-(m-methylphenoxy-carbonyloxy)-ethyl-N-ethylaniline, N-β-(p-cyclohexylphenoxy-carbonyloxy)-ethyl-N-ethylaniline, N-β-(β'-naphthoxy-carbonyloxy)-ethyl-N-ethylaniline, N-β-(o-iso-propoxyphenoxy-carbonyloxy)-ethyl-N-ethylaniline, N-β-(o,p-dichlorophenoxy-carbonyloxy)-ethyl-N-ethylaniline, N-β-(p-phenylphenoxy-carbonyloxy)-ethylaniline, N-β-(p-benzylphenoxy-carbonyloxy)-ethyl-N-ethylaniline, N-β-(o-benzylphenoxy-carbonyloxy)-ethyl-N-ethylaniline, N-β-(p-tert.-butylphenoxy-carbonyloxy)-ethyl-N-ethylaniline, N-β-(p-methoxyphenoxy-carbonyloxy)-ethyl-N-ethylaniline, N-β-(o-isopropylphenoxy-carbonyloxy)-ethyl-N-ethylaniline, N-δ-(phenoxy-carbonyloxy)-butyl-N-ethylaniline, N-β-(3,5-di-methyl-phenoxy-carbonyloxy)-ethyl-N-ethylaniline, N-β-(3,5-dimethyl-4-chlorophenoxy-carbonyloxy)-ethyl-N-ethylaniline, N-β-[p-(2-phenylisopropyl)-phenoxy-carbonyloxy]-ethyl-N-ethylaniline, N-β-(m-chlorophenoxy-carbonyloxy)-ethyl-N-ethylaniline, N-β-(2,5-dichlorophenoxy-carbonyloxy)-ethyl-N-ethylaniline, N-β-(2,4,5-trichlorophenoxy-carbonyloxy)-ethyl-N-ethylaniline. N-β-(2,4,6-trichlorophenoxy-carbonyloxy)-ethyl-N-ethylaniline, N-β-(2,6-dichlorophenoxy-carbonyloxy)-ethyl-N-ethylaniline, N-β-(pentachlorophenoxy-carbonyloxy)-ethyl-N-ethylaniline, N-β-(2-chloro-6-methylphenoxy-carbonyloxy)-ethyl-N-ethylaniline, N-β-(2-methyl-5-chlorophenoxy-carbonyloxy)-ethyl-N-ethylaniline, N-β-(2-methyl-4-chlorophenoxy-carbonyloxy)-ethyl-N-ethylaniline, N-β-(2-methyl-3-chlorophenoxy-carbonyloxy)-ethyl-N-ethylaniline, N-β-(2-chloro-5-methylphenoxy-carbonyloxy)-ethyl-N-ethylaniline, N-β-(3-methyl-4-chlorophenoxy-carbonyloxy)-ethyl-N-ethylaniline, N-β-(2,4,6-trichloro-3-methylphenoxy-carbonyloxy)-ethyl-N-ethylaniline, N-β-(2,3-dimethylphenoxy-carbonyloxy)-ethyl-N-ethylaniline, N-β-(3,4-dimethylphenoxy-carbonyloxy)-ethyl-N-ethylaniline, N-β-(2,6-dimethylphenoxy-carbonyloxy)-ethyl-N-ethylaniline, N-β-(2,4-dimethylphenoxy-carbonyloxy)-ethyl-N-ethylaniline, N-β-(2,5-dimethylphenoxy-carbonyloxy)-ethyl-N-ethylaniline, N-β -(3-methyl-5-ethylphenoxy-carbonyloxy)-ethyl-N-ethylaniline, N-β-(2,3,5-trimethylphenoxy-carbonyloxy)-ethyl-N-ethylaniline, N-β-(o-sec.-butylphenoxy-carbonyloxy)-ethyl-N-ethylaniline, N-β-(2-isopropyl-5-methylphenoxy-carbonyloxy)-ethyl-N-ethylaniline, N-β-(3-methyl-5-isopropylphenoxy-carbonyloxy)-ethyl-N-ethylaniline, N-β-[p-(1,1,3,3-tetramethylbutyl)-phenoxy-carbonyloxy]-ethyl-N-ethylaniline, N-β-(nonylphenoxy-carbonyloxy)-ethyl-N-ethylaniline, N-β-(dodecylphenoxy-carbonyloxy)-ethyl-N-ethylaniline, N-β-(2,6-diisopropylphenoxy-carbonyloxy)-ethyl-N-ethylaniline, N-β-(2-cyclohexylphenoxy-carbonyloxy)-ethyl-N-ethylaniline, N-β-(α'-naphthoxy-carbonyloxy)-ethyl-N-ethylaniline, N-β-(o-phenylphenoxy-carbonyloxy)-ethyl-N-ethylaniline, N-β-(m-phenylphenoxy-carbonyloxy)-ethyl-N-ethylaniline, N-β-(o-ethoxy-phenoxy-carbonyloxy)-ethyl-N-ethylaniline, N-β-(m-methoxyphenoxy-carbonyloxy)-ethyl-N-ethylaniline, N-β-(p-phenylsulphonylphenoxy-carbonyloxy)-ethyl-N-ethylaniline, N-β-(p-methoxycarbonylphenoxy-carbonyloxy)-ethyl-N-ethylaniline, N-β-phenoxy-carbonyloxy-n-butyl-N-ethylaniline, N-(1-phenoxycarbonyloxy)-sec.-butyl-N-ethylaniline, N-1-phenoxycarbonyloxy-i.-propyl-N-ethylaniline, N,N-bis-(β-phenoxy-carbonyloxyethyl)-aniline, N-cyclohexyl-N-β-phenoxycarbonyloxyethylaniline, N-benzyl-N-β-phenoxycarbonyloxyethyl-aniline, N-n-propyl-N-β-phenoxycarbonyloxyethyl-aniline, N-β-chloroethyl-N-β-phenoxycarbonyloxyethyl-aniline, N-β-bromoethyl-N-β-phenoxycarbonyloxyethyl-aniline, N-β-cyanoethyl-N-β-phenoxycarbonyloxyethyl-aniline, N-β-acetoxymethyl-N-β-phenoxycarbonyloxyethyl-aniline, N-β-methoxyethyl-N-β-phenoxycarbonyloxyethyl-aniline, N-β-butoxyethyl-N-β-phenoxycarbonyloxyethyl-aniline, N-β-hydroxy-n-butyl-N-β-phenoxycarbonyloxyethyl-aniline, N-β-hydroxy-n-propyl-N-β-phenoxycarbonyloxyethyl-aniline, N-cyanomethyl-N-β-phenoxycarbonyloxyethyl-aniline, N-β-carbonamidoethyl-N-β-phenoxycarbonyloxyethyl-aniline, N-benzoyl-methyl-N-ethylaniline, N-4-chlorobenzoyl-methyl-N-ethylaniline, N-2-chlorobenzoyl-methyl-N-ethylaniline, N-2,4-dichlorobenzoyl-methyl-N-ethylaniline, N-2,5-dichlorobenzoyl-methyl-N-ethylaniline, N-4-bromobenzoyl-methyl-N-ethylaniline, N-4-methylbenzoyl-methyl-N-ethylaniline, N-2,4-dimethylbenzoyl-methyl-N-ethylaniline, N-2,5-dimethylbenzoyl-methyl-N-ethylaniline, N-2,4,5-trimethylbenzoyl-methyl-N-ethylaniline, N-4-ethylbenzoyl-methyl-N-ethylaniline, N-3,4-dimethylbenzoyl-methyl-N-ethylaniline, N-2,3,4,5-tetramethylbenzoyl-methyl-N-ethylaniline, N-naphthoyl-methyl-N-ethylaniline, N-cyclohexyl-N-benzoylmethylaniline, N-benzyl-N-benzoylmethylaniline, N-n-propyl-N-benzoylmethylaniline, N-β-chloroethyl-N-benzoylmethylaniline, N-β-cyanoethyl-N-benzoylmethylaniline, N-β-acetoxyethyl-N-benzoylmethylaniline, N-β-methoxyethyl-N-benzoylmethylaniline, N-β-ethoxyethyl-N-benzoylmethylaniline, N-β-butoxyethyl-N-benzoylmethylaniline, N-cyanomethyl-N-benzoylmethylaniline, N-β-carbonamidoethyl-N-benzoylmethylaniline, N-β-phenoxy-carbonyloxyethyl-N-methylaniline, N-β-(β'-phenoxy-carbonyloxy-ethoxy)-ethyl-N-methylaniline, N-γ-(phenoxy-carbonyloxy)-propyl-N-methylaniline, N-β-(p-chlorophenoxy-carbonyloxy)-ethyl-N-methylaniline, N-β-(o-chlorophenoxy-carbonyloxy)-ethyl-N-methylaniline, N-β-(p-methylphenoxy-carbonyloxy)-ethyl-N-methylaniline, N-β-(o-methylphenoxy-carbonyloxy)-ethyl-N-methylaniline, N-β-(p-ethylphenoxy-carbonyloxy)-ethyl-N-methylaniline, N-β-(o-ethylphenoxy-carbonyloxy)-ethyl-N-methylaniline, N-β-(m-methylphenoxy-carbonyloxy)-ethyl-N-methylaniline, N-β-(p-cyclohexylphenoxy-carbonyloxy)-ethyl-N-methylaniline, N-β-(β'-naphthoxy-carbonyloxy)-ethyl-N-methylaniline, N-β-(p-isopropoxyphenoxy-carbonyloxy)-ethyl-N-methylaniline, N-β-(o,p-dichlorophenoxy-carbonyloxy)-ethyl-N-methylaniline, N-β-(p-phenylphenoxy-carbonyloxy)-ethyl-N-methylaniline, N-β-(p-benzylphenoxy-carbonyloxy)-ethyl-N-methylaniline, N-β-(o-benzylphenoxy-carbonyloxy)-ethyl-N-methylaniline, N-β-(p-tert.-butylphenoxy-carbonyloxy)-ethyl-N-methylaniline, N-β-(p-methoxyphenoxy-carbonyloxy)-ethyl-N-methylaniline, N-β-(o-isopropylphenoxy-carbonyloxy)-ethyl-N-methylaniline, N-δ-(phenoxy-carbonyloxy)-butyl-N-methylaniline, N-β-(3,5-dimethylphenoxy-carbonyloxy)-ethyl-N-methylaniline, N-β-(3,5-dimethyl-4-chlorophenoxy-carbonyloxy)-ethyl-N-methylaniline, N-β-[p-(2-phenylisopropyl)-phenoxy-carbonyloxy]-ethyl-N-methylaniline, N-β-(m-chlorophenoxy-carbonyloxy)-ethyl-N-methylaniline, N-β-(2,5-dichlorophenoxy-carbonyloxy)-ethyl-N-methylaniline, N-β-(2,4,5-trichlorophenoxy-carbonyloxy)-ethyl-N-methylaniline, N-β-phenoxy-carbonyloxy-ethyl-N-butylaniline, N-β-(β'-phenoxy-carbonyloxy-ethoxy)-ethyl-N-butylaniline, N-γ-(phenoxy-carbonyloxy)-propyl-N-butylaniline, N-β-(p-chlorophenoxy-carbonyloxy)-ethyl-N-butylaniline, N-β-(o-chlorophenoxy-carbonyloxy)-ethyl-N-butylaniline, N-β-(p-methylphenoxy-carbonyloxy)-ethyl-N-butylaniline, N-β-(o-methylphenoxy-carbonyloxy)-ethyl-N-butylaniline, N-β-(p-ethylphenoxy-carbonyloxy)-ethyl-N-butylaniline, N-β-(o-ethylphenoxy-carbonyloxy)-ethyl-N-butylaniline, N-β-(m-methylphenoxy-carbonyloxy)-ethyl-N-butylaniline, N-β-(p-cyclohexylphenoxy-carbonyloxy)-ethyl-N-butylaniline, N-β-(β'-naphthoxy-carbonyloxy)-ethyl-N-butylaniline, N-β-(o-isopropoxyphenoxy-carbonyloxy)-ethyl-N-butylaniline, N-β-(o,p-dichlorophenoxy-carbonyloxy)-ethyl-N-butylaniline, N-β-(p-phenylphenoxy-carbonyloxy)-ethyl-N-butylaniline, N-β-(p-benzylphenoxy-carbonyloxy)-ethyl-N-butylaniline, N-β-(o-benzylphenoxy-carbonyloxy)-ethyl-N-butylaniline, N-β-(p-tert.-butylphenoxy-carbonyloxy)-ethyl-N-butylaniline, N-β-(p-methoxyphenoxy-carbonyloxy)-ethyl-N-butylaniline, N-β-(isopropylphenoxy-carbonyloxy)-ethyl-N-butylaniline, N-δ-(phenoxy-carbonyloxy)-butyl-N-butylaniline, N-β-(3,5-dimethylphenoxy-carbonyloxy)-ethyl-N-butylaniline, N-β-(3,5-dimethyl-4-chlorophenoxy-carbonyloxy)-ethyl-N-butylaniline, N-β-[p-(2-phenylisopropyl)-phenoxy-carbonyloxy]-ethyl-N-butylaniline, N-β-(m-chlorophenoxy-carbonyloxy)-ethyl-N-butylaniline, N-β-(2,5-dichlorophenoxy-carbonyloxy)-ethyl-N-butylaniline, N-β-(2,4,5-trichlorophenoxy-carbonyloxy)-ethyl-N-butylaniline, N-β-phenoxy-carbonyloxy-ethyl-N-ethyl-3-chloroaniline, N-β-(β'-phenoxy-carbonyloxy-ethoxy)-ethyl-3-chloroaniline, N-γ-(phenoxy-carbonyloxy)-propyl-N-ethyl-3-chloroaniline, N-β-(phenoxy-carbonyloxy)-propyl-N-ethyl-3-chloroaniline, N-β-(p-chlorophenoxy-carbonyloxy)-ethyl-N-ethyl-3-chloroaniline, N-β-(p-methylphenoxy-carbonyloxy)-ethyl-N-ethyl-3-chloroaniline, N-β-(o-methylphenoxy-carbonyloxy)-ethyl-N-ethyl-3-chloroaniline, N-β-(p-ethylphenoxy-carbonyloxy)-ethyl-N-ethyl-3-chloroaniline, N-β-(o-ethylphenoxy-carbonyloxy)-ethyl-N-ethyl-3-chloroaniline, N-β-(m-methylphenoxy-carbonyloxy)-ethyl-N-ethyl-3-chloroaniline, N-β-(p-cyclohexylphenoxy-carbonyloxy)-ethyl-N-ethyl-3-chloroaniline, N-β-(β'-naphthoxy-carbonyloxy(-ethyl-N-ethyl-3-chloroaniline, N-β-(o-isopropoxy phenoxy-carbonyloxy)-ethyl-N-ethyl-3-chloroaniline, N-β-(o,p-dichlorophenoxy-carbonyloxy)-ethyl-N-ethyl-3-chloroaniline, N-β-(p-phenylphenoxy-cabonyloxy)-ethyl-N-ethyl-3chloroaniline, N-β-(p-benzylphenoxy-carbonyloxy)-ethyl-N-ethyl-3-chloroaniline, N-β-(o-benzyl-phenoxy-carbonyloxy)-ethyl-N-ethyl-3-chloroaniline, N-β-(p-tert.-butylphenoxy-carbonyloxy)-ethyl-N-ethyl-3-chloroaniline, N-β-(p-methoxyphenoxy-carbonyloxy)-ethyl-N-ethyl-3-chloroaniline, N-β-(o-isopropylphenoxy-carbonyloxy)-ethyl-N-ethyl-3-chloroaniline, N-δ-(phenoxy-carbonyloxy)-butyl-N-ethyl-3-chloroaniline, N-β-(3,5-dimethylphenoxy-carbonyloxy)-ethyl-N-ethyl-3-chloroaniline, N-β-(3,5-dimethyl-4-chlorophenoxy-carbonyloxy)-ethyl-N-ethyl-3N-β-[p-(2-phenylisopropyl)-phenoxy-carbonyloxy]-ethyl-N-ethyl-3-chloroaniline, N-β-(m-chlorophenoxy-carbonyloxy)-ethyl-N-ethyl-3-chloroaniline, N-β-(2,5-dichlorophenoxy-carboyloxy)-ethyl-N-ethyl-3-chloroaniline, N-β-(2,4,5-trichlorophenoxy-carbonyloxy)-ethyl-N-ethyl-3-chloroaniline, N-β-phenoxy-carbonyloxy-ethyl-N-ethyl-m-anisidine, N-β-(β'-phenoxy-carbonyloxy-ethoxy)-ethyl-N-ethyl-m- anisidine, N-γ-(phenoxy-carbonyloxy)-propyl-N-ethyl-m-anisidine, N-β-(p-chlorophenoxy-carbonyloxy)-ethyl-N-ethyl-m-anisidine, N-β-(o-chlorophenoxy-carbonyloxy)-ethyl-N-ethyl-m-anisidine, N-β-(p-methylphenoxy-carbonyloxy)-ethyl-N-ethyl-m-anisidine, N-β-(o-methylphenoxy-carbonyloxy)-ethyl-N-ethyl-m-anisidine, N-β-(p-ethylphenoxy-carbonyloxy)-ethyl-N-ethyl-m-anisidine, N-β-(o-ethylphenoxy-carbonyloxy)-ethyl-N-ethyl-m-anisidine, N-β-(m-methylphenoxy-carbonyloxy)-ethyl-N-ethyl-m-anisidine, N-β-(p-cyclohexylphenoxy-carbonyloxy)-ethyl-N-ethyl-m-anisidine, N-β-(β'-naphthoxy-carbonyloxy)-ethyl-N-ethyl-m-anisidine, N-β-(o-isopropoxyphenoxy-carbonyloxy)-ethyl-N-ethyl-m-anisidine, N-β-(o,p-dichlorophenoxy-carbonyloxy)-ethyl-N-ethyl-m-anisidine, N-β-(-p-phenylphenoxy-carbonyloxy)-ethyl-N-ethyl-m-anisidine, N-β-(p-benzylphenoxy-carbonyloxy)-ethyl-N-ethyl-m-anisidine, N-β-(o-benzylphenoxy-carbonyloxy)-ethyl-N-ethyl-m-anisidine, N-β-(p-tert.-butylphenoxy-carbonyloxy)-ethyl-N-ethyl-m-anisidine, N-β-(p-methoxyphenoxy-carbonyloxy)-ethyl-N-ethyl-m-anisidine, N-β-(o-isopropylphenoxy-carbonyloxy)-ethyl-N-ethyl-m-anisidine, N-δ-(phenoxy-carbonyloxy)-butyl-N-ethyl-m-anisidine, N-β-(3,5-dimethylphenoxy-carbonyloxy)-ethyl-N-ethyl-m-anisidine, N-β-(3,5-dimethyl-4-chlorophenoxy-carbonyloxy)-ethyl-N-ethyl-m-anisidine, N-β-[p-(2-phenylisopropyl)-phenoxy-carbonyloxy]-ethyl-N-ethyl-m-anisidine, N-β-(m-chlorophenoxy-carbonyloxy)-ethyl-N-ethyl-m-anisidine, N-β-(2,5-dichlorophenoxy-carbonyloxy)-ethyl-N-ethyl-m-anisidine, N-β-(2,4,5-trichloro-phenoxy-carbonyloxy)-ethyl-N-ethyl-m-anisidine, N-β-phenoxy-carbonyloxy-ethyl-N-ethyl-m-toluidine, N-β-(β'-phenoxy-carbonyloxyethoxy)-ethyl-N-ethyl-m-toluidine, N-γ-(phenoxy-carbonyloxy)-propyl-N-ethyl-m-toluidine, N-β-(p-chlorophenoxy-carbonyloxy)-ethyl-N-ethyl-m-toluidine, N-β-(o-chlorophenoxy-carbonyloxy)-ethyl-N-ethyl-m-toluidine, N-β-(p-methylphenoxy-carbonyloxy)-ethyl-N-ethyl-m-toluidine, N-β-(o-methylphenoxy-carbonyloxy)-ethyl-N-ethyl-m-toluidine, N-β-(p-ethylphenoxy-carbonyloxy)-ethyl-N-ethyl-m-toluidine, N-β-(o-ethylphenoxy-carbonyloxy)-ethyl-N-ethyl-m-toluidine, N-β-(m-methylphenoxy-carbonyloxy)-ethyl-N-ethyl-m-toluidine, N-β-(p-cyclohexylphenoxy-carbonyloxy)-ethyl-N-ethyl-m-toluidine, N-β-(β'-naphthoxy-carbonyloxy)-ethyl-N-ethyl-m-toluidine, N-β-(o-isopropoxyphenoxy-carbonyloxy)-ethyl-N-ethyl-m-toluidine, N-β-(o,p-dichlorophenoxy-carbonyloxy)-ethyl-N-ethyl-m-toluidine, N-β-(p-phenylphenoxy-carbonyloxy)-ethyl-N-ethyl-m-toluidine, N-β-(p-benzylphenoxy-carbonyloxy)-ethyl-N-ethyl-m-toluidine, N-β-(o-benzylphenoxy-carbonyloxy)-ethyl-N-ethyl-m-toluidine, N-β-(p-tert.-butylphenoxy-carbonyloxy)-ethyl-N-ethyl-m-toluidine, N-β-(p-methoxyphenoxy-carbonyloxy)-ethyl-N-ethyl-m-toluidine, N-β-(o-isopropylphenoxy-carbonyloxy)-ethyl-N-ethyl-m-toluidine, N-δ-(phenoxy-carbonyloxy)-butyl-N-ethyl-m-toluidine, N-β-(3,5-dimethylphenoxy-carbonyloxy)-ethyl-N-ethyl-m-toluidine, N-β-(3,5-dimethyl-4-chlorophenoxy-carbonyloxy)-ethyl-N-ethyl-m-toluidine, N-β-[p-(2-phenylisopropyl)-phenoxy-carbonyloxy]-ethyl-N-ethyl-m-toluidine, N-β-(m-chlorophenoxy-carbonyloxy)-ethyl-N-ethyl-m-toluidine, N-β-(2,5-dichlorophenoxy-carbonyloxy)-ethyl-N-ethyl-m-toluidine, N-β-(2,4,5-trichloro-phenoxy-carbonyloxy)-ethyl-N-ethyl-m-toluidine, N-β-(α'-naphthoxy-carbonyloxy)-ethyl-N-methylaniline, N-β-(α'-naphthoxy-carbonyloxy)-ethyl-N-ethyl-3-chloroaniline, N-β-(α'-naphthoxy-carbonyloxy)-ethyl-N-ethyl-3-methoxyaniline, N-β-(α'-naphthoxy-carbonyloxy)-ethyl-N-ethyl-n-toluidine, N-β-(o-methoxyphenoxy-carbonyloxy)-ethyl-N-ethylaniline, N-β-(phenoxycarbonyloxy)-ethyl-N-methyl-3-chloroaniline, N-β-(phenoxycarbonyloxy)-ethyl-N-methyl-3-methoxyaniline, M-β-(phenoxycarbonyloxy)-ethyl-N-methyl-m-toluidine, N-β-(phenoxycarbonyloxy)-ethyl-N-methyl-3-ethoxyaniline, N-β-(phenoxycarbonyloxy)-ethyl-N-ethyl-3-ethoxyaniline, N-β-(phenoxycarbonyloxy)-ethyl-N-butyl-3-chloroaniline, N-β-(phenoxycarbonyloxy)-ethyl-N-butyl-3-methoxyaniline, N-β-(phenoxycarbonyloxy)-ethyl-N-butyl-m-toluidine, N-β-(phenoxy-carbonyloxy)-ethyl-N-butyl-3-ethoxyaniline, N-β-(phenoxy-carbonyloxy)-ethyl-N-ethyl-2-methylaniline, N-β-(phenoxy-carbonyloxy)-ethyl-N-ethyl-2-methoxyaniline, N-β-(phenoxy-carbonyloxy)-ethyl-N-ethyl 3-acetylaminoaniline, N-β-(phenoxy-carbonyloxy)-ethyl-N-ethyl-2-acetylaminoaniline, N-β-(phenoxy-carbonyloxy)-ethyl-N-ethyl-2-phenoxyaniline, N-β-(phenoxy-carbonyloxy)-ethyl-N-ethyl-2-benzyloxyaniline, N-β-(phenoxy-carbonyloxy)-ethyl-3-benzyloxyaniline, N-β-(o-phenylphenoxycarbonyloxy)-ethyl-N-ethyl-3-chloroaniline, N-β-(o-phenylphenoxycarbonyloxy)-ethyl-N-methylaniline, N-β-(o-phenylphenoxycarbonyloxy)-ethyl-N-butylaniline, N-β-(o-phenylphenoxycarbonyloxy)-ethyl-N-ethyl-m-anisidine, N-β-(phenoxycarbonyloxy)-ethyl-N-ethyl-3-trifluoromethylaniline, N-β-(phenoxycarbonyloxy)-ethyl-N-ethyl-2,3-dimethylaniline, N-β-(phenoxycarbonyloxy)-ethyl-N-ethyl-α-naphthylamine, N-β-(phenoxycarbonyloxy)-ethyl-N-ethyl-2-methoxy-5-chloroaniline, N-β-(phenoxycarbonyloxy)-ethyl-N-ethyl-2-phenoxy-5-chloroaniline, N-β-(phenoxycarbonyloxy-ethyl-N-ethyl-2-methyl-5-methoxyaniline, N-β-(phenoxycarbonyloxy)-ethyl-N-ethyl-2,5-dimethoxyaniline, N-β-(phenoxycarbonyloxy)-ethyl-N-ethyl-2-methoxy-5-ethylsulphonylaniline, N-benzoylmethyl-N-methyl-3-chloroaniline, N-benzoylmethyl-N-methyl-3-methoxyaniline, N-benzoylmethyl-N-methyl-3-methylaniline, N-benzoylmethyl-N-methyl-3-ethoxyaniline, N-benzoylmethyl-N-ethyl-3-ethoxyaniline, N-benzoylmethyl-N-butyl-3-chloroaniline, N-benzoylmethyl-N-butyl-3-methoxyaniline, N-benzoylmethyl-N-butyl-3-methylaniline, N-benzoylmethyl-N-butyl-3-ethoxyaniline, N-benzoylmethyl-N-ethyl-2-methylaniline, N-benzoylmethyl-N-ethyl-2-methoxyaniline, N-benzoylmethyl-N-ethyl-3-acetylaminoaniline, N-benzoylmethyl-N-ethyl-2-acetylaminoaniline, N-benzoylmethyl-N-ethyl-3-benzyloxyaniline, N-benzoylmethyl-N-ethyl-2-phenoxyaniline, N-benzoylmethyl-N-ethyl-3-tri-benzyloxyaniline, N-benzoylmethyl-N-ethyl-2,3-fluoromethylaniline, dimethylaniline, N-benzoylmethyl-N-ethyl-α-naphthylamine, N-benzoylmethyl-N-ethyl-2-methoxy-5-chloroaniline, N-benzoylmethyl-N-ethyl-2-phenoxy-5-chloroaniline, N-benzoylmethyl-N-ethyl-2-methyl-5-methoxyaniline, N-benzoylmethyl-N-ethyl-2,5-dimethoxyaniline, N-benzoylmethyl-N-ethyl-2-methoxy-5-ethylsulphonylaniline, N-benzoylmethyl-N-methylaniline, N-benzoylmethyl-N-butylaniline, N-benzoylmethyl-N-ethyl-3-chloroaniline, N-benzoylmethyl-N-ethyl-3-methoxyaniline, N-4-chlorobenzoylmethyl-N-ethyl-3-methoxyaniline, N-4-chlorobenzoylmethyl-N-ethyl-3-chloroaniline, N-4-chlorobenzoylmethyl-N-methylaniline, N-4-chlorobenzoylmethyl-N-butylaniline, N-4-methylbenzoylmethyl-N-butylaniline, N-4-methylbenzoylmethyl-N-methylaniline, N-4-methylbenzoylmethyl-N-ethyl-3-methoxyaniline, N-4-methylbenzoylmethyl-N-ethyl-3-chloroaniline, N-2,5-dimethylbenzoylmethyl-N-ethyl-chloroaniline, N-2,5-dimethylbenzoylmethyl-N-ethyl-3-methoxyaniline, N-2,5-dimethylbenzoylmethyl-N-butylaniline, N-2,5-dimethyl-benzoylmethyl-N-methylaniline, N-n-propyl-N-benzoylmethyl-3-methoxyaniline, N-n-propyl-N-benzoylmethyl-3-chloroaniline, N-n-propyl-N-benzoylmethyl-3-methylaniline, N-β-chloroethyl-N-benzoylmethyl-3-methoxyaniline, N-β-chloroethyl-N-benzoyl-methyl-3-chloroaniline, N-β-chloroethyl-N-benzoylmethyl-3-methylaniline, N-β-carbonamidoethyl-N-benzoylmethyl-3-chloroaniline, N-β-carbonamidoethyl-N-benzoylmethyl-3-methoxyaniline, N-β-carbonamidoethyl-N-benzoylmethyl-3-methylaniline, N-β-acetoxyethyl-N-benzoylmethyl-3-chloroaniline, N-β-acetoxyethyl-N-benzoylmethyl-3-methoxyaniline, N-β-acetoxyethyl-N-benzoylmethyl-3-methylaniline, N-β-methoxyethyl-N-benzoyl-methyl-3-methoxyaniline, N-β-cyanoethyl-N-benzoylmethyl-3-methoxyaniline, N-cyclohexyl-N-benzoylmethyl-3-methoxyaniline, N-cyclohexyl-N-benzoylmethyl-3-chloroaniline, N-cyclohexyl-N-benzoylmethyl-3-methylaniline, N-β-phenoxycarbonyloxyethyl-2-methylindoline, N-β-phenoxycarbonyloxyethyl-2,3,3-trimethylindoline, N-β-phenoxycarbonyloxyethyl-1,2,3,4-tetrahydroquinoline, N-β-phenoxycarbonyloxyethyl-2,2,4-trimethyltetra-hydroquinoline, N-benzoylmethyl-2-methylindoline, N-benzoylmethyl-2,3,3-trimethylindoline, N-benzoylmethyl-tetrahydroquinoline and N-benzoylmethyl-2,2,4-trimethyltetrahydroquinoline.

The new dyestuffs can be used for dyeing, printing and bulk dyeing of materials containing acid groups, above all of products which consist entirely or predominantly of polymerised unsaturated nitriles, such as acrylonitrile and vinylidene cyanide, or of acid-modified polyesters or acid-modified polyamides. They are distinguished by a high affinity for the fibre. They are furthermore suitable for the other known uses of cationic dyestuffs, such as dyeing and printing cellulose acetate, coir, jute, sisal and silk, tannin-treated cotton and paper, for the production of ball pen pastes and rubber-stamp inks and for use in flexographic printing. The dyeings and prints on the first-mentioned materials, especially on polyacrylonitrile, are distinguished by a very high level of fastness, above all by very good fastness to light, wet processing, rubbing, decatising, sublimation and perspiration.

The dyestuffs can be used individually or as mixtures.

The dyestuffs according to the invention, and their mixtures, are furthermore very suitable for dyeing shaped articles of polymers of copolymers of acrylonitrile, asymmetrical dicyanoethylene and acid-modified aromatic polyesters in chlorohydrocarbon dyebaths, especially if they carry substances, such as, for example, the tertiary butyl group or the dodecyl group, which promote the solubility in chlorohydrocarbons, or the anion X⁻ is the anion of a monobasic organic acid with 4–30 carbon atoms.

The parts mentioned in the examples are parts by weight, unless stated otherwise.

EXAMPLE 1 a. Preparation of the azo dyestuff 4.2 parts of 3-amino-1,2,4-triazole are dissolved in a mixture of 40 parts of glacial acetic acid, 20 parts of water and 10 parts of concentrated sulphuric acid. An amount of nitrosylsulphuric acid corresponding to 3.5 parts of sodium nitrite is added dropwise to the solution at −7° C. The reaction mixture is then stirred at this temperature for about 30 minutes, 0.3 part of amidosulphonic acid is then added, and the mixture is stirred for a further 10 minutes and then stirred into a suspension of 50 parts of ice, 2.5 parts of concentrated sulphuric acid and 16.1 parts of N-ethyl-N-β-phenoxycarbonyloxyethylaniline hydrochloride. After stirring for 1 hour at about −5° C, the acid salt of the dyestuff of the formula

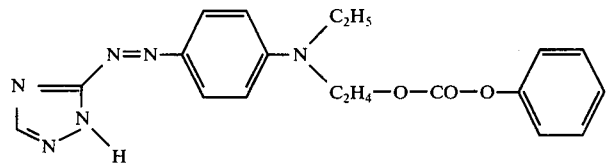

is precipitated by dropwise addition of 19.5 parts of 15% strength sodium hydroxide solution and simultaneous gradual introduction of 150 parts of ice. The product is separated from the solution, suspended in 150 parts if water and converted into the acid-free azo dyestuff by neutralising the suspension with dilute sodium hydroxide solution. The dyestuff is pressed out and washed with water until free from salt.

b. Quaternisation of the azo dyestuff

The moist azo dyestuff is suspended in 30 parts of water. After addition of 0.8 part of magnesium oxide, 10 parts of dimethyl sulphate are added dropwise to the suspension at 10° C. The temperature of the reaction mixture is raised to 15° C over the course of 1 hour, 4 parts of dimethyl sulphate are then added dropwise and a further 0.4 part of magnesium oxide is added. The temperature is then raised to 19° C over the course of 1 hour and the suspension is stirred for 1 hour at this temperature and then heated to 96° – 100° C. The resulting solution is clarified with 1 part of active charcoal and made up to 150 parts by volume by adding water. The dyestuff is precipitated from the solution by adding 37 parts of sodium chloride. It crystallises, after stirring for several hours, as a mixture of the isomeric salts:

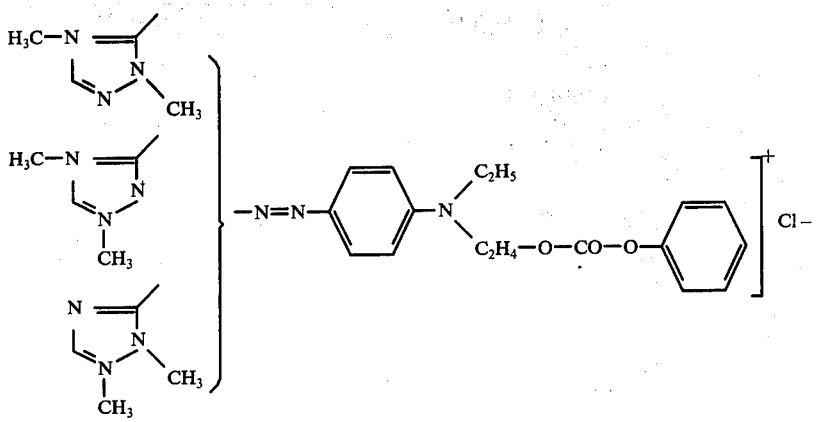

The dyestuff is filtered off and dried in vacuo. On fibrous materials of polyacrylonitrile, it gives clear red dyeings which are distinguished by very good fastness to light and to wet processing.

EXAMPLE 2

The azo dyestuff which as been prepared according to Example 1(a) and has subsequently been dried is suspended in 45 parts of dimethylformamide, 1.5 parts of magnesium oxide are added to the suspension and 18 parts of dimethyl sulphate are then added dropwise at room temperature. The alkylation and quaternisation take place in a weakly exothermic reaction. After stirring for a further 5 hours, the solvent is removed in vacuo (15 mm Hg) at 70° C. The residue is dissolved in 200 parts of boiling water, the solution is clarified with 2 parts of active charcoal, and the dyestuff is precipitated as the zinc chloride double salt by addition of 40 parts of sodium chloride and 10 parts of zinc chloride.

The tinctorial properties of the dyestuff obtained are identical with those of the dyestuff obtained according to Example 1(b).

Instead of using dimethyl sulphate, the quaternisation can also be carried out with equal success using p-toluene-sulphonic acid methyl ester or methyl liodide.

The same dyestuff is also obtained if the procedure followed is as indicated in Example 1, but in process step (a), in place of 3-amino-1,2,4-triazole, the equivalent amount of 5-amino-1,2,4-triazolecarboxylic acid is reacted to give the azo dyestuff of the formula

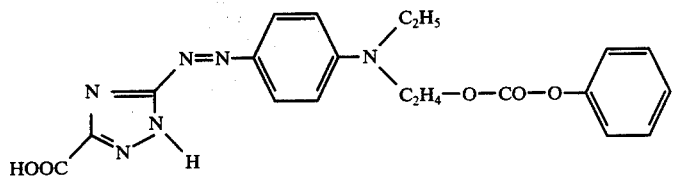

and this is alkylated and quaternised in accordance with one of the procedures described in Example 1(b) or in Example 2. Hereupon, decarboxylation occurs, and the dyestuff isomer mixture described in Example 1 is obtained.

Equivalent dyestuffs are also obtained if the procedure followed is as in Example 1, but instead of N-ethyl-N-β-phenylcarbonyloxyethylaniline the equivalent amount of one of the coupling components indicated in the table which follows is employed and the quaternisation is carried out in accordance with the process indicated in Example 1 or the process indicated in Example 2. The colour shade, also indicated in the table, was obtained on fibrous materials of polyacrylonitrile (PAC).

| Coupling Component | Colour Shade on PAN |
|---|---|
| N-β-(o-methylphenoxy-carbonyloxy)-ethyl-N-ethylaniline | red |
| N-β-(p-ethylphenoxy-carbonyloxy)-ethyl-N-ethylaniline | " |
| N-β-(o-ethylphenoxy-carbonyloxy)-ethyl-N-ethylaniline | " |
| N-β-(m-methylphenoxy-carbonyloxy)-ethyl-N-ethylaniline | " |
| N-β-(p-cyclohexylphenoxy-carbonyloxy)-ethyl-N-ethylaniline | " |
| N-β-(β'-naphthoxy-carbonyloxy)-ethyl-N-ethylaniline | " |
| N-β-(o-isopropoxyphenoxy-carbonyloxy)-ethyl-N-ethylaniline | " |
| N-β-(o,p-dichlorophenoxy-carbonyloxy)-ethyl-N-ethylaniline | " |
| N-β-(p-phenylphenoxy-carbonyloxy)-ethyl-N-ethylaniline | " |
| N-β-(p-benzylphenoxy-carbonyloxy)-ethyl-N-ethylaniline | " |
| N-β-(o-benzylphenoxy-carbonyloxy)-ethyl-N-ethylaniline | " |
| N-β-(p-tert.-butylphenoxy-carbonyloxy)-ethyl-N-ethylaniline | " |
| N-β-(p-methoxyphenoxy-carbonyloxy)-ethyl-N-ethylaniline | " |
| N-β-(o-isopropylphenoxy-carbonyloxy)-ethyl-N-ethylaniline | " |
| N-δ-(phenoxy-carbonyloxy)-butyl-N-ethylaniline | " |
| N-β-(3,5-dimethylphenoxy-carbonyloxy)-ethyl-N-ethylaniline | " |
| N-β-[p-(2-phenylisopropyl)-phenoxy-carbonyloxy]-ethyl-N-ethylaniline | " |
| N-β-(m-chlorophenoxy-carbonyloxy)-ethyl-N-ethylaniline | " |
| N-β-(2,5-dichlorophenoxy-carbonyloxy)-ethyl-N-ethylaniline | " |
| N-β-(2,4,5-trichlorophenoxy-carbonyloxy)-ethyl-N-ethylaniline | " |
| N-β-(2,4-dimethylphenoxy-carbonyloxy)-ethyl-N-ethylaniline | " |
| N-β-(2,5-dimethylphenoxy-carbonyloxy)-ethyl-N-ethylaniline | " |

-continued

| Coupling Component | Colour Shade on PAN |
|---|---|
| N-β-(3-methyl-5-ethylphenoxy-carbonyloxy)-ethyl-N-ethylaniline | " |
| N-β-(2,3,5-trimethylphenoxy-carbonyloxy)-ethyl-N-ethylaniline | " |
| N-β-(o-sec.-butylphenoxy-carbonyloxy)-ethyl-N-ethylaniline | " |
| N-β-(2-isopropyl-5-methylphenoxy-carbonyloxy)-ethyl-N-ethylaniline | " |
| N-β-(3-methyl-5-isopropylphenoxy-carbonyloxy)-ethyl-N-ethylaniline | " |
| N-β-[p-(1,1,3,3-tetramethylbutyl)phenoxy-carbonyloxy]-ethyl-N-ethylaniline | " |
| N-β-(nonylphenoxy-carbonyloxy)-ethyl-N-ethylaniline | " |
| N-β-(dodecylphenoxy-carbonyloxy)-ethyl-N-ethylaniline | " |
| N-β-(2,6-diisopropylphenoxy-carbonyloxy)-ethyl-N-ethylaniline | " |
| N-β-(2-cyclohexylphenoxy-carbonyloxy)-ethyl-N-ethylaniline | " |
| N-β-(α'-naphthoxy-carbonyloxy)-ethyl-N-ethylaniline | " |
| N-β-(o-phenylphenoxy-carbonyloxy)-ethyl-N-ethylaniline | " |
| N-β-(m-phenylphenoxy-carbonyloxy)-ethyl-N-ethylaniline | " |
| N-β-(β'-phenoxy-carbonyloxy-ethoxy)-ethyl-N-ethylaniline | " |
| N-γ-(phenoxy-carbonyloxy)-propyl-N-ethylaniline | " |
| N-β-(p-chlorophenoxy-carbonyloxy)-ethyl-N-ethylaniline | " |
| N-β-(o-chlorophenoxy-carbonyloxy)-ethyl-N-ethylaniline | " |
| N-β-(p-methylphenoxy-carbonyloxy)-ethyl-N-ethylaniline | " |
| N-benzoyl-methyl-N-ethylaniline | " |
| N-4-chlorobenzoyl-methyl-N-ethylaniline | " |
| N-2-chlorobenzoyl-methyl-N-ethylaniline | " |
| N-2,4-dichlorobenzoyl-methyl-N-ethylaniline | " |
| N-2,5-dichlorobenzoyl-methyl-N-ethylaniline | " |
| N-4-bromobenzoyl-methyl-N-ethylaniline | " |
| N-β-(2,4,6-trichlorophenoxy-carbonyloxy)-ethyl-N-ethylaniline | " |
| N-β-(2,6-dichlorophenoxy-carbonyloxy)-ethyl-N-ethylaniline | " |
| N-β-(pentachlorophenoxy-carbonyloxy)-ethyl-N-ethylaniline | " |
| N-β-(2-chloro-6-methylphenoxy-carbonyloxy)-ethyl-N-ethylaniline | " |
| N-β-(2-methyl-5-chlorophenoxy-carbonyloxy)-ethyl-N-ethylaniline | " |
| N-β-(2-methyl-4-chlorophenoxy-carbonyloxy)-ethyl-N-ethylaniline | " |
| N-β-(2-methyl-3-chlorophenoxy-carbonyloxy)-ethyl-N-ethylaniline | " |
| N-β-(2-chloro-5-methylphenoxy-carbonyloxy)-ethyl-N-ethylaniline | " |
| N-β-(3-methyl-4-chlorophenoxy-carbonyloxy)-ethyl-N-ethylaniline | " |
| N-β-(2,4,6-trichloro-3-methylphenoxy-carbonyloxy)-ethyl-N-ethylaniline | " |
| N-β-(2,3-dimethylphenoxy-carbonyloxy)-ethyl-N-ethylaniline | " |
| N-β-(3,4-dimethylphenoxy-carbonyloxy)-ethyl-N-ethylaniline | " |
| N-β-(2,6-dimethylphenoxy-carbonyloxy)-ethyl-N-ethylaniline | " |
| N-β-(o-ethoxy-phenoxy-carbonyloxy)-ethyl-N-ethylaniline | " |
| N-β-(m-methoxyphenoxy-carbonyloxy)-ethyl-N-ethylaniline | " |
| N-β-(p-phenylsulphonylphenoxy-carbonyloxy)-ethyl-N-ethylaniline | " |
| N-β-(p-methoxycarbonylphenoxy-carbonyloxy)-ethyl-N-ethylaniline | " |
| N-β-phenoxy-carbonyloxy-n-butyl-N-ethylaniline | " |
| N-(1-phenoxy-carbonyloxy)-sec.-butyl-N-ethylaniline | " |
| N-1-phenoxycarbonyloxy-i.-propyl-N-ethylaniline | " |
| N,N-bis-(β-phenoxycarbonyloxyethyl)-aniline | " |
| N-cyclohexyl-N-β-phenoxycarbonyloxyethyl-aniline | " |
| N-benzyl-N-β-phenoxycarbonyloxyethyl-aniline | " |
| N-n-propyl-N-β-phenoxycarbonyloxyethyl-aniline | " |
| N-β-chloroethyl-N-β-phenoxycarbonyloxyethyl-aniline | " |
| N-β-bromoethyl-N-β-phenoxycarbonyloxyethyl-aniline | " |
| N-β-cyanoethyl-N-β-phenoxycarbonyloxyethyl-aniline | " |
| N-β-acetoxyethyl-N-β-phenoxycarbonyloxyethyl-aniline | " |
| N-β-methoxyethyl-N-β-phenoxy-carbonyloxyethyl-aniline | " |
| N-β-butoxyethyl-N-β-phenoxy-carbonyloxyethyl-aniline | " |
| N-β-hydroxy-n-butyl-N-β-phenoxy-carbonyloxyethyl-aniline | " |
| N-β-hydroxy-n-propyl-N-β-phenoxy-carbonyloxyethyl-aniline | " |
| N-cyanomethyl-N-β-phenoxy-carbonyloxyethyl-aniline | " |
| N-β-carbonamidoethyl-N-β-phenoxy-carbonyloxyethyl-aniline | " |
| N-4-methylbenzoyl-methyl-N-ethylaniline | " |
| N-2,4-dimethylbenzoyl-methyl-N-ethylaniline | " |
| N-2,5-dimethylbenzoyl-methyl-N-ethylaniline | " |
| N-2,4,5-trimethylbenzoyl-methyl-N-ethylaniline | " |
| N-4-ethylbenzoyl-methyl-N-ethylaniline | " |
| N-3,4-dimethylbenzoyl-methyl-N-ethylaniline | " |
| N-2,3,4,5-tetramethylbenzoyl-methyl-N-ethylaniline | " |
| N-naphthoyl-methyl-N-ethylaniline | " |
| N-cyclohexyl-N-benzoylmethylaniline | " |
| N-benzyl-N-benzoylmethyl aniline | " |
| N-n-propyl-N-benzoylmethylaniline | " |
| N-β-chloroethyl-N-benzoylmethylaniline | " |
| N-β-cyanoethyl-N-benzoylmethylaniline | " |
| N-β-acetoxyethyl-N-benzoylmethylaniline | " |
| N-β-methoxyethyl-N-benzoylmethylaniline | " |
| N-β-ethoxyethyl-N-benzoylmethylaniline | " |
| N-β-butoxyethyl-N-benzoylmethylaniline | " |
| N-cyanomethyl-N-benzoylmethylaniline | " |
| N-β-carbonamidoethyl-N-benzoylmethylaniline | " |
| N-β-(o-methylphenoxy-carbonyloxy)-ethyl-N-methylaniline | " |
| N-β-(p-ethylphenoxy-carbonyloxy)-ethyl-N-methylaniline | " |
| N-β-(o-ethylphenoxy-carbonyloxy)-ethyl-N-methylaniline | " |
| N-β-(m-methylphenoxy-carbonyloxy)-ethyl-N-methylaniline | " |
| N-β-(p-cyclohexylphenoxy-carbonyloxy)-ethyl-N-methylaniline | " |
| N-β-(β'-naphthoxy-carbonyloxy)-ethyl-N-methylaniline | " |
| N-β-(o-isopropoxyphenoxy-carbonyloxy)-ethyl-N-methylaniline | " |
| N-β-(o,p-dichlorophenoxy-carbonyloxy)-ethyl-N-methylaniline | " |
| N-β-(p-phenylphenoxy-carbonyloxy)-ethyl-N-methylaniline | " |
| N-β-(p-benzylphenoxy-carbonyloxy)-ethyl-N-methylaniline | " |
| N-β-(o-benzylphenoxy-carbonyloxy)-ethyl-N-methylaniline | " |
| N-β-(p-tert.-butylphenoxy-carbonyloxy)-ethyl-N-methylaniline | " |
| N-β-(p-methoxyphenoxy-carbonyloxy)-ethyl-N-methylaniline | " |
| N-β-(o-isopropylphenoxy-carbonyloxy)-ethyl-N-methylaniline | " |
| N-δ-(phenoxy-carbonyloxy)-butyl-N-methylaniline | " |
| N-β-(3,5-dimethylphenoxy-carbonyloxy)-ethyl-N-methylaniline | " |

-continued

| Coupling Component | Colour Shade on PAN |
|---|---|
| N-β-(3,5-dimethyl-4-chlorophenoxy-carbonyloxy)-ethyl-N-methylaniline | " |
| N-β-[p-(2-phenylisopropyl)-phenoxy-carbonyloxy]-ethyl-N-methylaniline | " |
| N-β-(m-chlorophenoxy-carbonyloxy)-ethyl-N-methylaniline | " |
| N-β-(2,5-dichlorophenoxy-carbonyloxy)-ethyl-N-methylaniline | " |
| N-β-(2,4,5-trichlorophenoxy-carbonyloxy)-ethyl-N-methylaniline | " |
| N-β-(o,p-dichlorophenoxy-carbonyloxy)-ethyl-N-butylaniline | " |
| N-β-(p-phenylphenoxy-carbonyloxy)-ethyl-N-butylaniline | " |
| N-β-(p-benzylphenoxy-carbonyloxy)-ethyl-N-butylaniline | " |
| N-β-(o-benzylphenoxy-carbonyloxy)-ethyl-N-butylaniline | " |
| N-β-(p-tert.-butylphenoxy-carbonyloxy)-ethyl-N-butylaniline | " |
| N-β-(p-methoxyphenoxy-carbonyloxy)-ethyl-N-butylaniline | " |
| N-β-(o-isopropylphenoxy-carbonyloxy)-ethyl-N-butylaniline | " |
| N-β-(phenoxy-carbonyloxy)-butyl-N-butylaniline | " |
| N-β-(3,5-dimethylphenoxy-carbonyloxy)-ethyl-N-butylaniline | " |
| N-β-(3,5-dimethyl-4-chlorophenoxy-carbonyloxy)-ethyl-N-butylaniline | " |
| N-β-[p-(2-phenylisopropyl)-phenoxy-carbonyloxy]-ethyl-N-butylaniline | " |
| N-β-(m-chlorophenoxy-carbonyloxy)-ethyl-N-butylaniline | " |
| N-β-(2,5-dichlorophenoxy-carbonyloxy)-ethyl-N-butylaniline | " |
| N-β-(2,4,5-trichlorophenoxy-carbonyloxy)-ethyl-N-butylaniline | " |
| N-β-phenoxy-carbonyloxy-ethyl-N-methylaniline | " |
| N-β-(β'-phenoxy-carbonyloxy-ethoxy)-ethyl-N-methylaniline | " |
| N-γ-(phenoxy-carbonyloxy)-propyl-N-methylaniline | " |
| N-β-(p-chlorophenoxy-carbonyloxy)-ethyl-N-methylaniline | " |
| N-β-(o-chlorophenoxy-carbonyloxy)-ethyl-N-methylaniline | " |
| N-β-(p-methylphenoxy-carbonyloxy)-ethyl-N-methylaniline | " |
| N-δ-(phenoxy-carbonyloxy)-butyl-N-ethyl-3-chloroaniline | " |
| N-β-(3,5-dimethylphenoxy-carbonyloxy)-ethyl-N-ethyl-3-chloroaniline | " |
| N-β-(3,5-dimethyl-4-chlorophenoxy-carbonyloxy)-ethyl-N-ethyl-3-chloroaniline | " |
| N-β-[p-(2-phenylisopropyl)-phenoxy-carbonyloxy]-ethyl-N-ethyl-3-chloroaniline | " |
| N-β-(m-chlorophenoxy-carbonyloxy)-ethyl-N-ethyl-3-chloroaniline | " |
| N-β-(2,5-dichlorophenoxy-carbonyloxy)-ethyl-N-ethyl-3-chloroaniline | " |
| N-β-(2,4,5-trichlorophenoxy-carbonyloxy)-ethyl-N-ethyl-3-chloroaniline | " |
| N-β-phenoxy-carbonyloxy-ethyl-N-butylaniline | " |
| N-β-(β'-phenoxy-carbonyloxy-ethoxy)-ethyl-N-butylaniline | " |
| N-γ-(phenoxy-carbonyloxy)-propyl-N-butylaniline | " |
| N-β-(p-chlorophenoxy-carbonyloxy)-ethyl-N-butylaniline | " |
| N-β-(o-chlorophenoxy-carbonyloxy)-ethyl-N-butylaniline | " |
| N-β-(p-methylphenoxy-carbonyloxy)-ethyl-N-butylaniline | " |
| N-β-(o-methylphenoxy-carbonyloxy)-ethyl-N-butylaniline | " |
| N-β-(p-ethylphenoxy-carbonyloxy)-ethyl-N-butylaniline | " |
| N-β-(o-ethylphenoxy-carbonyloxy)-ethyl-N-butylaniline | " |
| N-β-(m-methylphenoxy-carbonyloxy)-ethyl-N-butylaniline | " |
| N-β-(p-cyclohexylphenoxy-carbonyloxy)-ethyl-N-butylaniline | " |
| N-β-(β'-naphthoxy-carbonyloxy)-ethyl-N-butylaniline | " |
| N-β-(o-isopropoxyphenoxy-carbonyloxy)-ethyl-N-butylaniline | " |
| N-β-phenoxy-carbonyloxy-ethyl-N-ethyl-3-chloroaniline | " |
| N-β-(β'-phenoxy-carbonyloxy-ethoxy)-ethyl-N-ethyl-3-chloroaniline | " |
| N-γ-(phenoxy-carbonyloxy)-propyl-N-ethyl-3-chloroaniline | " |
| N-β-(p-chlorophenoxy-carbonyloxy)-ethyl-N-ethyl-3-chloroaniline | " |
| N-β-(o-chlorophenoxy-carbonyloxy)-ethyl-N-ethyl-3-chloroaniline | " |
| N-β-(p-methylphenoxy-carbonyloxy)-ethyl-N-ethyl-3-chloroaniline | " |
| N-β-(o-methylphenoxy-carbonyloxy)-ethyl-N-ethyl-3-chloroaniline | " |
| N-β-(p-ethylphenoxy-carbonyloxy)-ethyl-N-ethyl-3-chloroaniline | " |
| N-β-(o-ethylphenoxy-carbonyloxy)-ethyl-N-ethyl-3-chloroaniline | " |
| N-β-(m-methylphenoxy-carbonyloxy)-ethyl-N-ethyl-3-chloroaniline | " |
| N-β-(p-cyclohexylphenoxy-carbonyloxy)-ethyl-N-ethyl-3-chloroaniline | " |
| N-β-(β'-naphthoxy-carbonyloxy)-ethyl-N-ethyl-3-chloroaniline | " |
| N-β-(o-isopropoxyphenoxy-carbonyloxy)-ethyl-N-ethyl-3-chloroaniline | " |
| N-β-(o,p-dichlorophenoxy-carbonyloxy)-ethyl-N-ethyl-3-chloroaniline | " |
| N-β-(p-phenylphenoxy-carbonyloxy)-ethyl-N-ethyl-3-chloroaniline | " |
| N-β-(p-benzylphenoxy-carbonyloxy)-ethyl-N-ethyl-3-chloroaniline | " |
| N-β-(p-benzylphenoxy-carbonyloxy)-ethyl-N-ethyl-3-chloroaniline | " |
| N-β-(p-tert.-butylphenoxy-carbonyloxy)-ethyl-N-ethyl-3-chloroaniline | " |
| N-β-(p-methoxyphenoxy-carbonyloxy)-ethyl-N-ethyl-3-chloroaniline | " |
| N-β-(o-isopropylphenoxy-carbonyloxy)-ethyl-N-ethyl-3-chloroaniline | " |
| N-β-(o-methylphenoxy-carbonyloxy)-ethyl-N-ethyl-m-anisidine | yellowish-tinged red |
| N-β-(p-ethylphenoxy-carbonyloxy)-ethyl-N-ethyl-m-anisidine | " |
| N-β-(o-ethylphenoxy-carbonyloxy)-ethyl-N-ethyl-m-anisidine | " |
| N-β-(m-methylphenoxy-carbonyloxy)-ethyl-N-ethyl-m-anisidine | " |
| N-β-(p-cyclohexylphenoxy-carbonyloxy)-ethyl-N-ethyl-m-anisidine | " |
| N-β-(β'-naphthoxy-carbonyloxy)-ethyl-N-ethyl-m-anisidine | " |
| N-β-(o-isopropoxyphenoxy-carbonyloxy)-ethyl-N-ethyl-m-anisidine | " |
| N-β-(o,p-dichlorophenoxy-carbonyloxy)-ethyl-N-ethyl-m-anisidine | " |
| N-β-(p-phenylphenoxy-carbonyloxy)-ethyl-N-ethyl-m-anisidine | " |
| N-β-(p-benzylphenoxy-carbonyloxy)-ethyl-N-ethyl-m-anisidine | " |
| N-β-(o-benzylphenoxy-carbonyloxy)-ethyl-N-ethyl-m-anisidine | " |
| N-β-(p-tert.-butylphenoxy-carbonyloxy)-ethyl-N-ethyl-m-anisidine | " |
| N-β-(p-methoxyphenoxy-carbonyloxy)-ethyl-N-ethyl-m-anisidine | " |
| N-β-(o-isopropylphenoxy-carbonyloxy)-ethyl-N-ethyl-m-anisidine | " |
| N-δ-(phenoxy-carbonyloxy)-butyl-N-ethyl-m-anisidine | " |
| N-β-(3,5-dimethylphenoxy-carbonyloxy)-ethyl-N-ethyl-m-anisidine | " |
| N-β-(3,5-dimethyl-4-chlorophenoxy-carbonyloxy)-ethyl-N-ethyl-m-anisidine | " |
| N-β-[p-(2-phenylisopropyl)-phenoxy-carbonyloxy]-ethyl-N-ethyl-m-anisidine | " |
| N-β-(m-chlorophenoxy-carbonyloxy)-ethyl-N-ethyl-m-anisidine | " |
| N-β-(2,5-dichlorophenoxy-carbonyloxy)-ethyl-N-ethyl-m-anisidine | " |
| N-β-(2,4,5-trichlorophenoxy-carbonyloxy)-ethyl-N-ethyl-m-anisidine | " |
| N-β-(o,p-dichlorophenoxy-carbonyloxy)-ethyl-N-ethyl-m-toluidine | red |
| N-β-(p-phenylphenoxy-carbonyloxy)-ethyl-N-ethyl-m-toluidine | " |
| N-β-(p-benzylphenoxy-carbonyloxy)-ethyl-N-ethyl-m-toluidine | " |
| N-β-(o-benzylphenoxy-carbonyloxy)-ethyl-N-ethyl-m-toluidine | " |
| N-β-(p-tert.-butylphenoxy-carbonyloxy)-ethyl-N-ethyl-m-toluidine | " |
| N-β-(p-methoxyphenoxy-carbonyloxy)-ethyl-N-ethyl-m-toluidine | " |
| N-β-(o-isopropylphenoxy-carbonyloxy)-ethyl-N-ethyl-m-toluidine | |

-continued

| Coupling Component | Colour Shade on PAN |
|---|---|
| N-β-(phenoxy-carbonyloxy)-butyl-N-ethyl-m-toluidine | " |
| N-β-(3,5-dimethylphenoxy-carbonyloxy)-ethyl-N-ethyl-m-toluidine | " |
| N-β-(3,5-dimethyl-4-chlorophenoxy-carbonyloxy)-ethyl-N-ethyl-m-toluidine | " |
| N-β-[p-(2-phenylisopropyl)-phenoxy-carbonyloxy]-ethyl-N-ethyl-m-toluidine | " |
| N-β-(m-chlorophenoxy-carbonyloxy)-ethyl-N-ethyl-m-toluidine | " |
| N-β-(2,5-dichlorophenoxy-carbonyloxy)-ethyl-N-ethyl-m-toluidine | " |
| N-β-(2,4,5-trichlorophenoxy-carbonyloxy)-ethyl-N-ethyl-m-toluidine | " |
| N-β-phenoxy-carbonyloxy-ethyl-N-ethyl-m-anisidine | yellowish-tinged red |
| N-β-(β'-phenoxy-carbonyloxy-ethoxy)-ethyl-N-ethyl-m-anisidine | " |
| N-γ-(phenoxy-carbonyloxy)-propyl-N-ethyl-m-anisidine | " |
| N-β-(p-chlorophenoxy-carbonyloxy)-ethyl-N-ethyl-m-anisidine | " |
| N-β-(o-chlorophenoxy-carbonyloxy)-ethyl-N-ethyl-m-anisidine | " |
| N-β-(p-methylphenoxy-carbonyloxy)-ethyl-N-ethyl-m-anisidine | " |
| N-β-Phenoxy-carbonyloxy-ethyl-N-ethyl-m-toluidine | red |
| N-β-(β'-phenoxy-carbonyloxy-ethoxy)-ethyl-N-ethyl-m-toluidine | " |
| N-γ-(phenoxy-carbonyloxy)-propyl-N-ethyl-m-toluidine | " |
| N-β-(p-chlorophenoxy-carbonyloxy)-ethyl-N-ethyl-m-toluidine | " |
| N-β-(o-chlorophenoxy-carbonyloxy)-ethyl-N-ethyl-m-toluidine | " |
| N-β-(p-methylphenoxy-carbonyloxy)-ethyl-N-ethyl-m-toluidine | " |
| N-β-(o-methylphenoxy-carbonyloxy)-ethyl-N-ethyl-m-toluidine | " |
| N-β-(p-ethylphenoxy-carbonyloxy)-ethyl-N-ethyl-m-toluidine | " |
| N-β-(o-ethylphenoxy-carbonyloxy)-ethyl-N-ethyl-m-toluidine | " |
| N-β-(m-methylphenoxy-carbonyloxy)-ethyl-N-ethyl-m-toluidine | " |
| N-β-(p-cyclohexylphenoxy-carbonyloxy)-ethyl-N-ethyl-m-toluidine | " |
| N-β-(β'-naphthoxy-carbonyloxy)-ethyl-N-ethyl-m-toluidine | " |
| N-β-(o-isopropoxyphenoxy-carbonyloxy)-ethyl-N-ethyl-m-toluidine | " |
| N-β-(α'-naphthoxy-carbonyloxy)-ethyl-N-methylaniline | " |
| N-β-(α'-naphthoxy-carbonyloxy)-ethyl-N-ethyl-3-chloroaniline | " |
| N-β-(α'-naphthoxy-carbonyloxy)-ethyl-N-ethyl-3-methoxyaniline | yellowish-tinged red |
| N-β-(α'-naphthoxy-carbonyloxy)-ethyl-N-ethyl-m-toluidine | red |
| N-β-(o-methoxy-phenoxy-carbonyloxy)-ethyl-N-ethylaniline | " |
| N-β-(phenoxycarbonyloxy)-ethyl-N-methyl-3-chloroaniline | " |
| N-β-(phenoxycarbonyloxy)-ethyl-N-methyl-3-methoxyaniline | yellowish-tinged red |
| N-β-(phenoxycarbonyloxy)-ethyl-N-methyl-m-toluidine | red |
| N-β-(phenoxycarbonyloxy)-ethyl-N-methyl-3-ethoxyaniline | yellowish-tinged red |
| N-β-(phenoxycarbonyloxy)-ethyl-N-ethyl-3-ethoxyaniline | " |
| N-β-(phenoxycarbonyloxy)-ethyl-N-butyl-3-chloroaniline | red |
| N-β-(phenoxycarbonyloxy)-ethyl-N-butyl-3-methoxyaniline | yellowish-tinged red |
| N-β-(phenoxycarbonyloxy)-ethyl-N-butyl-m-toluidine | red |
| N-β-(phenoxycarbonyloxy)-ethyl-N-butyl-3-ethoxyaniline | yellowish-tinged red |
| N-β-(phenoxycarbonyloxy)-ethyl-N-ethyl-2-methylaniline | red |
| N-β-(phenoxycarbonyloxy)-ethyl-N-ethyl-2-methoxyaniline | " |
| N-β-(phenoxycarbonyloxy)-ethyl-N-ethyl-3-acetylaminoaniline | " |
| N-β-(phenoxycarbonyloxy)-ethyl-N-ethyl-2-acetylaminoaniline | " |
| N-β-(phenoxycarbonyloxy)-ethyl-N-ethyl-2-phenoxyaniline | " |
| N-β-(phenoxycarbonyloxy)-ethyl-N-ethyl-2-benzyloxyaniline | " |
| N-β-(phenoxycarbonyloxy)-ethyl-N-ethyl-3-benzyloxyaniline | " |
| N-β-(o-phenylphenoxycarbonyloxy)-ethyl-N-ethyl-3-chloroaniline | " |
| N-β-(o-phenylphenoxycarbonyloxy)-ethyl-N-methylaniline | " |
| N-β-(o-phenylphenoxycarbonyloxy)-ethyl-N-butylaniline | " |
| N-β-(o-phenylphenoxycarbonyloxy)-ethyl-N-ethyl-m-anisidine | yellowish-tinged red |
| N-β-(phenoxycarbonyloxy)-ethyl-N-ethyl-3-trifluoromethylaniline | red |
| N-β-(phenoxycarbonyloxy)-ethyl-N-ethyl-2,3-dimethylaniline | " |
| N-β-(phenoxycarbonyloxy)-ethyl-N-ethyl- -naphthylamine | " |
| N-β-(phenoxycarbonyloxy)-ethyl-N-ethyl-2-methoxy-5-chloroaniline | " |
| N-β-(phenoxycarbonyloxy)-ethyl-N-ethyl-2-phenoxy-5-chloroaniline | " |
| N-β-(phenoxycarbonyloxy)-ethyl-N-ethyl-2-methyl-5-methoxyaniline | " |
| N-β-(phenoxycarbonyloxy)-ethyl-N-ethyl-2-methyl-5-methoxyaniline | " |
| N-β-(phenoxycarbonyloxy)-ethyl-N-ethyl-2,5-dimethoxyaniline | " |
| N-β-(phenoxycarbonyloxy)-ethyl-N-ethyl-2-methoxy-5-ethylsulphonylaniline | " |
| N-benzoylmethyl-N-methyl-3-chloroaniline | yellowish-tinged red |
| N-benzoylmethyl-N-methyl-3-methoxyaniline | " |
| N-benzoylmethyl-N-methyl-3-methylaniline | red |
| N-benzoylmethyl-N-methyl-3-ethoxyaniline | yellowish-tinged red |
| N-benzoylmethyl-N-ethyl-3-ethoxyaniline | " |
| N-benzoylmethyl-N-butyl-3-chloroaniline | red |
| N-benzoylmethyl-N-butyl-3-methoxyaniline | yellowish-tinged red |
| N-benzoylmethyl-N-butyl-3-methylaniline | red |
| N-benzoylmethyl-N-butyl-3-ethoxyaniline | yellowish-tinged red |
| N-benzoylmethyl-N-ethyl-2-methylaniline | red |
| N-benzoylmethyl-N-ethyl-2-methoxyaniline | " |
| N-benzoylmethyl-N-ethyl-3-acetylaminoaniline | " |
| N-benzoylmethyl-N-ethyl-2-acetylaminoaniline | " |
| N-benzoylmethyl-N-ethyl-3-benzyloxyaniline | " |
| N-benzoylmethyl-N-ethyl-2-phenoxyaniline | " |
| N-benzoylmethyl-N-ethyl-2-benzyloxyaniline | " |
| N-benzoylmethyl-N-ethyl-3-trifluoromethylaniline | " |
| N-benzoylmethyl-N-ethyl-2,3-dimethylaniline | " |
| N-benzoylmethyl-N-ethyl-α-naphthylamine | " |
| N-benzoylmethyl-N-ethyl-2-methoxy-5-chloroaniline | " |
| N-benzoylmethyl-N-ethyl-2-phenoxy-5-chloroaniline | " |
| N-benzoylmethyl-N-ethyl-2-methyl-5-methoxyaniline | " |
| N-benzoylmethyl-N-ethyl-2,5-dimethoxyaniline | " |
| N-benzoylmethyl-N-ethyl-2-methoxy-5-ethylsulphonylaniline | " |
| N-benzoylmethyl-N-methylaniline | " |
| N-benzoylmethyl-N-butylaniline | " |
| N-benzoylmethyl-N-ethyl-3-chloroaniline | yellowish-tinged red |
| N-benzoylmethyl-N-ethyl-3-methoxyaniline | " |
| N-4-chlorobenzoylmethyl-N-ethyl-3-methoxyaniline | " |
| N-4-chlorobenzoylmethyl-N-methylaniline | red |
| N-4-chlorobenzoylmethyl-N-butylaniline | " |
| N-4-methylbenzoylmethyl-N-butylaniline | " |
| N-4-methylbenzoylmethyl-N-methylaniline | " |

-continued

| Coupling Component | Colour Shade on PAN |
|---|---|
| N-4-methylbenzoylmethyl-N-ethyl-3-methoxyaniline | yellowish-tinged red |
| N-4-methylbenzoylmethyl-N-ethyl-3-chloroaniline | " |
| N-2,5-dimethylbenzoylmethyl-N-ethyl-3-chloroaniline | " |
| N-2,5-dimethylbenzoylmethyl-N-ethyl-3-methoxyaniline | " |
| N-2,5-dimethylbenzoylmethyl-N-butylaniline | red |
| N-2,5-dimethylbenzoylmethyl-N-methylaniline | " |
| N-n-propyl-N-benzoylmethyl-3-methoxyaniline | yellowish-tinged red |
| N-n-propyl-N-benzoylmethyl-3-chloroaniline | red |
| N-n-propyl-N-benzoylmethyl-3-methylaniline | " |
| N-β-chloroethyl-N-benzoylmethyl-3-methoxyaniline | yellowish-tinged red |
| N-β-chloroethyl-N-benzoylmethyl-3-chloroaniline | " |
| N-β-chloroethyl-N-benzoylmethyl-3-methylaniline | red |
| N-β-carbonamidoethyl-N-benzoylmethyl-3-chloroaniline | " |
| N-β-carbonamidoethyl-N-benzoylmethyl-3-methoxyaniline | yellowish-tinged red |
| N-β-carbonamidoethyl-N-benzoylmethyl-3-methylaniline | red |
| N-β-acetoxyethyl-N-benzoylmethyl-3-chloroaniline | " |
| N-β-acetoxyethyl-N-benzoylmethyl-3-methoxyaniline | yellowish-tinged red |
| N-β-acetoxyethyl-N-benzoylmethyl-3-methylaniline | red |
| N-β-methoxyethyl-N-benzoylmethyl-3-methoxyaniline | yellowish-tinged red |
| N-β-phenoxycarbonyloxyethyl-2-methylindoline | bluish-tinged red |
| N-β-phenoxycarbonyloxyethyl-2,3,3-trimethylindoline | " |
| N-β-phenoxycarbonyloxyethyl-1,2,3,4-tetrahydroquinoline | " |
| N-β-phenoxycarbonyloxyethyl-2,2,4-trimethyltetrahydroquinoline | " |
| N-benzoylmethyl-2-methylindoline | " |
| N-benzoylmethyl-2,3,3-trimethylindoline | " |
| N-benzoylmethyl-tetrahydroquinoline | " |
| N-benzoylmethyl-2,2,4-trimethyltetrahydroquinoline | " |
| N-β-cyanoethyl-N-benzoylmethyl-3-methoxyaniline | yellowish-tinged red |
| N-cyclohexyl-N-benzoylmethyl-3-methoxyaniline | " |
| N-cyclohexyl-N-benzoylmethyl-3-chloroaniline | red |
| N-cyclohexyl-N-benzoylmethyl-3-methylaniline | " |

EXAMPLE 3

The procedure followed is as described in Example 2, but instead of dimethyl sulphate the equivalent amount of diethyl sulphate is used and the reaction temperature is raised to 70° C. The dyestuff mixture of the formula

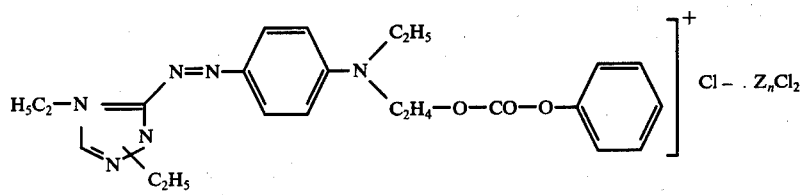

is obtained. This mixture gives clear red dyeings, distinguished by good fastness properties, on fibrous materials of polyacrylonitrile.

If, in preparing the dyestuffs mentioned in the table accompanying Example 2, diethyl sulphate is used instead of dimethyl sulphate, under the conditions indicated above, equivalent dyestuffs are obtained.

EXAMPLE 4

8.4 parts of the azo dyestuff prepared according to Example 1(a), which has subsequently been dried, are stirred with 15 parts of acetonitrile and 15 parts of n-butyl bromide, 0.5 part of magnesium oxide is added and the mixture is heated to 80° C for 12 hours. The solvents are then distilled off at 15 mm Hg. The distillation residue is dissolved in 200 parts of boiling water. After clarifying the solution with 2 parts of active charcoal, the dyestuff is precipitated by adding 20 parts of sodium chloride and 10 parts of zinc chloride to the solution. The dyestuff has the formula

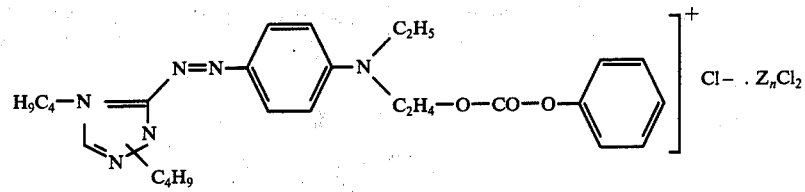

and dyes fibrous materials of polyacrylonitrile in a clear red colour shade.

EXAMPLE 5

The procedure followed is as described in Example 4, but the butyl bromide is replaced by the equivalent amount of benzyl bromide. The dyestuff of the formula

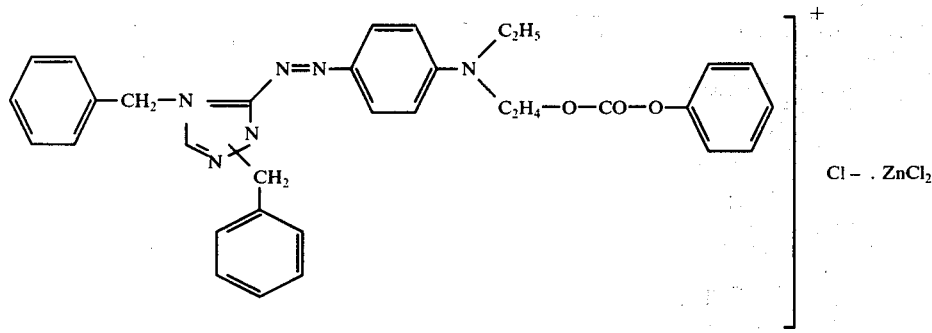

is obtained. It dyes fibrous materials of polyacrylonitrile in a bluish-tinged red colour shade.

EXAMPLE 6

16.5 parts of the azo dyestuff prepared according to the coupling instruction indicated in Example 1(a) are stirred in 60 parts of glacial acetic acid at 50° C. Ethylene oxide is then passed in, until azo dyestuff is no longer detectable in a thin layer chromatogram. The resulting cationic dyestuff is caused to crystallise by diluting the reaction solution with 500 parts of saturated sodium chloride solution and is filtered off and dried. It has the formula

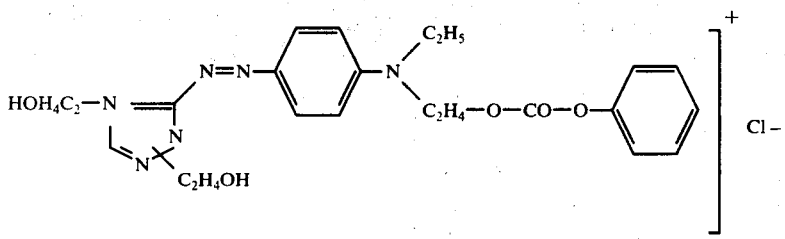

and dyes fibrous materials of polyacrylonitrile in a bluish-tinged red.

EXAMPLE 7

The procedure followed is as described in Example 6 but instead of introducing ethylene oxide, 15 parts of 1,2-butylene oxide are added dropwise at 80° C. The dyestuff of the formula

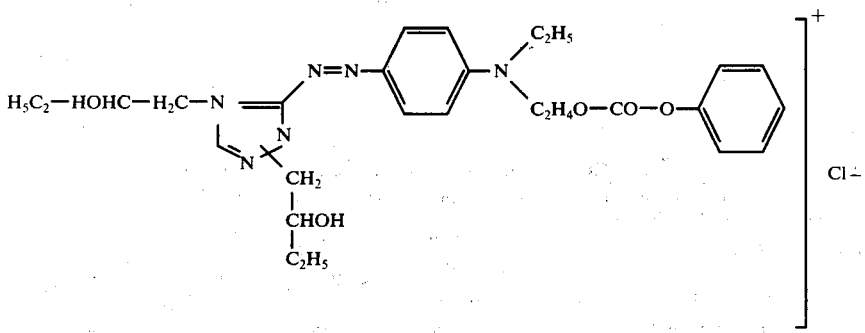

is obtained. It dyes fibrous materials of polyacrylonitrile in a bluish-tinged red.

If instead of butylene oxide the equivalent amount of γ-phenoxypropylene oxide was employed, an equivalent dyestuff was obtained, which also dyes fibrous materials of polyacrylonitrile in a bluish-tinged red.

Equivalent red dyestuffs are also obtained if, in preparing the dyestuffs listed in Example 2 or in the table accompanying Example 2, the quaternisation is not carried out with dimethyl sulphate, as stated there, but in the manner described in Examples 6 and 7 with ethylene oxide, propylene oxide, butylene oxide, γ-phenoxypropylene oxide, styrene oxide, γ-ethoxypropylene oxide, γ-propoxypropylene oxide, epichlorohydrin, γ-methoxypropylene oxide, γ-butoxypropylene oxide or other epoxides.

EXAMPLE 8

8.7 parts of the non-quaternised azo dyestuff described in Example 1(a) are stirred with 35.5 parts of acrylic acid amide and 90 parts of glacial acetic acid, 5 parts of 36% strength hydrochloric acid are added to the mixture and the solution is heated to 90° for 1 hour. It is then stirred into 1,000 parts of saturated sodium chloride solution and 30 parts of zinc chloride are added. The dyestuff is separated from the aqueous phase and dissolved in 20 parts of boiling water. After clarifying the solution with 8 parts of active charcoal, the dyestuff is precipitated by adding 40 parts of sodium chloride. It has the formula

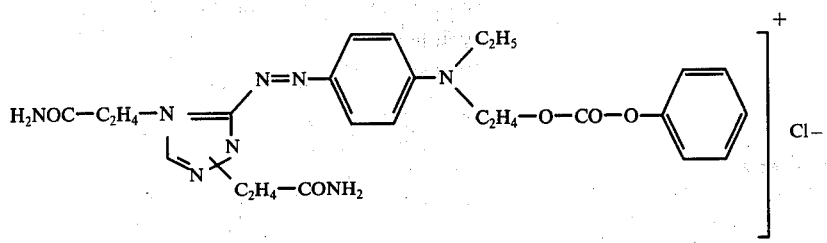

and dyes fibrous materials of polyacrylonitrile in a clear red.

If instead of acrylic acid amide an equivalent amount of acrylic acid was used, an equivalent red dyestuff of the formula

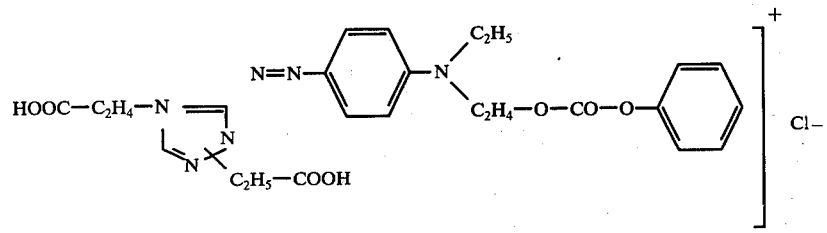

was obtained.

Equivalent red dyestuffs are also obtained if, in the preparation of the dyestuffs listed in Example 2 or in the table accompanying Example 2, the quaternisation is not carried out with dimethyl sulphate, as indicated there, but as described above with acrylic acid amide or acrylic acid.

EXAMPLE 9

A polyacrylonitrile fabric is printed with a printing paste which was prepared as follows: 330 parts of hot water are poured over 30 parts of the dyestuff described in Example 1(b), 50 parts of thiodiethylene glycol, 30 part of cyclohexanol and 30 parts of 30% strength acetic acid and the resulting solution is added to 500 parts of crystal gum (gum arabic as a thickener). Finally, 30 parts of zinc nitrate solution are also added.

The resulting print is dried, steamed for 30 minutes and then rinsed. A red print having very good fastness properties is obtained.

EXAMPLE 10

Acid-modified polyglycol terephthalate fibres are introduced, using a liquor ratio of 1 : 40, into an aqueous bath at 20° C, which contains, per liter, 3 to 10 g of sodium sulphate, 0.1 to 1 g of oleyl alcohol polyglycol ether (from 1 mol of oleyl alcohol + 50 mols of ethylene oxide), 0 to 15 g of dimethylbenzyldodecylammonium chloride and 0.15 g of the dyestuff described in 10th place in the table accompanying Example 2, and has been adjusted to pH 4 – 5 with acetic acid. The bath is heated to 100° C over the course of 30 minutes and is kept at this temperature for 60 minutes. The fibres are then rinsed and dried. A red dyeing having very good fastness properties is obtained.

EXAMPLE 11

Polyacrylonitrile fibres are introduced, using a liquor ratio of 1:40, into an aqueous bath at 40° C which contains, per liter, 0.75 g of 30% strength acetic acid, 0.38 g of sodium acetate and 0.15 g of the dyestuff described in Example 1. The bath is heated to the boil over the course of 20 to 30 minutes and is kept at this temperature for 30 to 60 minutes. After rinsing and drying, a red dyeing having very good fastness properties is obtained.

EXAMPLE 12

A stock solution is prepared from 15 parts of the dyestuff mentioned in Example 1, 15 parts of polyacrylonitrile and 70 parts of dimethylformamide and is added to a customary spinning solution of polyacrylonitrile, which is then spun in a known manner. A red dyeing having very good fastness properties is obtained.

EXAMPLE 13

Acid-modified synthetic polyamide fibres are introduced, using a liquor ratio of 1:40, into an aqueous bath at 40° C which contains, per liter, 10 g of sodium acetate, 1 to 5 g of oleyl alcohol polyglycol ether (prepared from 1 mol of oleyl alcohol and 50 mols of ethylene oxide) and 0.3 g of the dyestuff described in Example 1, and has been adjusted to pH 4 – 5 with acetic acid. The bath is heated to 98° over the course of 30 minutes and is kept at this temperature. The fibres are then rinsed and dried. A red dyeing is obtained.

I claim:

1. Cationic dyestuff of the formula

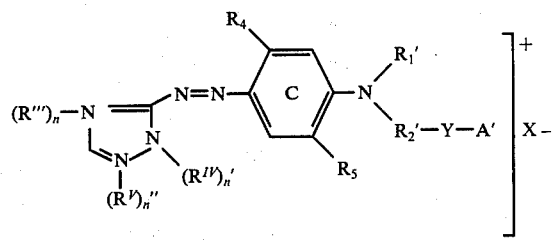

in which
R''', R$^{IV}$ and R$^V$ independently of one another represent $C_1$-$C_6$-alkyl, $C_2$-$C_7$-alkenyl, benzyl, cyclohexyl, phenylethyl, or any of these five radicals substituted by fluoro, chloro, bromo, hydroxyl, cyano, $C_1$-$C_4$-alkylcarbonyloxy, $C_1$-$C_4$-alkoxycarbonyl, hydroxycarbonyl, or aminocarbonyl;

R$^{III}$, R$^{IV}$, and R$^V$ also represent the radical

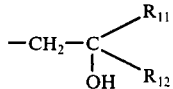

wherein
R$_{11}$ denotes hydrogen or methyl and
R$_{12}$ denotes methyl, ethyl, fluoro, chloro, bromo, C$_1$-C$_4$-alkoxy, C$_2$-C$_4$-alkenyloxymethyl, C$_2$-C$_4$-alkenyloxyphenyl, phenoxymethyl, or phenoxyphenyl;
R$_1$, represents hydrogen, C$_1$-C$_6$-alkyl, C$_2$-C$_7$-alkenyl, cyclopentyl, cyclohexyl, benzyl, β-phenylethyl, C$_1$-C$_6$-alkylcyclopentyl, C$_1$-C$_6$-alkylcyclohexyl, C$_1$-C$_6$-alkylbenzyl, C$_1$-C$_6$-alkyl-β-phenylethyl, or C$_1$-C$_6$-alkyl substituted by fluoro, chloro, bromo, hydroxyl, C$_1$-C$_4$-alkoxy, cyano, acetoxy, hydroxycarbonyl, C$_1$-C$_4$-alkoxycarbonyl, C$_1$-C$_4$-alkoxycarbonyloxy, aminocarbonyl, C$_1$-C$_4$-alkylsulphonylamino or C$_1$-C$_4$-alkylsulphonyl-C$_1$-C$_4$-alkylamino;
R$_2'$ represents C$_1$-C$_6$-alkylene or C$_1$-C$_6$-alkylene interrupted by oxygen, said alkylene being either unsubstituted or substituted by C$_1$-C$_4$-alkoxy, C$_2$-C$_4$-alkenyloxy, phenyl or phenoxy;
R$_4$ represents hydrogen, fluoro, chloro, bromo, C$_1$-C$_6$-alkyl, fluoro, C$_1$-C$_6$-alkyl, chloro-C$_1$-C$_6$-alkyl, bromo-C$_1$-C$_6$-alkyl, C$_1$-C$_4$-alkoxy, benzyl, β-phenylethoxy, C$_1$-C$_4$-alkylcarbonylamino or C$_1$-C$_4$-alkylsulphonylamino, phenylcarbonylamino or phenylsulphonylamino, C$_1$-C$_4$-alkylcarbonyloxy or phenylcarbonyloxy, or benzyl or β-phenylethoxy, substituted in the phenyl ring by C$_1$-C$_6$-alkyl, cyano, phenoxy or naphthyloxy, C$_1$-C$_6$-alkylphenoxy, C$_1$-C$_6$-alkylnaphthyloxy, fluorophenoxy, chlorophenoxy, bromophenoxy, fluoronaphthyloxy, chloronaphthyloxy, or bromonaphthyloxy;
R$_4$, when together toget her with ring C also represents a naphthalene ring or a tetralin ring;
R$_5$ represents hydrogen, C$_1$-C$_6$-alkyl, C$_1$-C$_4$-alkoxy, benzyloxy, β-phenylethoxy, C$_1$-C$_6$-alkylbenzyloxy, C$_1$-C$_6$-alkyl-β-phenylethoxy, phenoxy, naphthyloxy, C$_1$-C$_6$-alkylphenoxy, C$_1$-C$_6$-alkylnaphthyloxy, fluorophenoxy, chlorophenoxy, bromophenoxy, fluoronaphthyloxy, chloronaphthyloxy, bromonaphthyloxy, C$_1$-C$_4$-alkylcarbonylamino, C$_1$-C$_4$-alkylsulphonylamino, phenylcarbonylamino, phenylsulphonylamino, C$_1$-C$_4$-alkylcarbonyloxy or phenylcarbonyloxy;
R$_5$ when taken together with ring C also represents a naphthalene ring or a tetralin ring;

A' represents phenyl, naphthyl or tetrahydronaphthyl, or any of said radicals substituted by C$_1$-C$_4$-alkyl, C$_1$-C$_4$-alkoxy, fluoro, chloro, bromo, phenyl, cyclohexyl, C$_1$-C$_4$-alkoxycarbonyl, benzyl, C$_1$-C$_4$-alkylsulphonyl or phenylsulphonyl, wherein the ring structures are unsubstituted or are substituted by fluoro, chloro, bromo, C$_1$-C$_4$-alkyl or C$_1$-C$_4$-alkoxy;
Y denotes —CO— or —O—CO—O—;
$n, n'$, and $n''$ independently of each other are 0 or 1 with the proviso that $n + n' + n''$ is 2; and
X$^-$ denotes an anion.

2. Cationic dyestuff according to claim 1, characterised in that they correspond to the formula

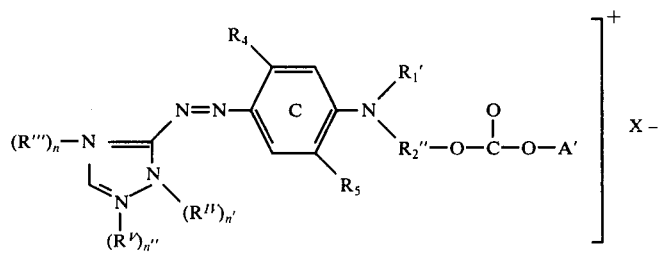

in which
R''', R$^{IV}$, R$^V$, R$_1'$, R$_4$, R$_5$, A', X-, $n$, $n'$ and $n''$ have the meaning indicated in claim 1 and
R$_2''$ represents the groups

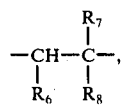

—(CH$_2$)$_p$— or —(CH$_2$)$_p$—O—CH$_2$—CH$_2$— in which
R$_6$ denotes hydrogen, methyl, ethyl, methoxymethyl, ethoxymethyl, propoxymethyl, butoxymethyl, allyloxymethyl, phenyl or phenoxymethyl,
R$_7$ denotes hydrogen, methyl, ethyl, butoxymethyl, methoxymethyl, ethoxymethyl, propoxymethyl, allyloxymethyl, phenyl, phenoxymethyl or —O—CO—O—A,
R$_8$ denotes a hydrogen or methyl and
$p$ denotes a number from 1 to 6.

3. Cationic dyestuff according to claim 2, in which
R''', R$^{IV}$ and R$^V$ independently of one another represent methyl, ethyl or benzyl,
R$_5$ represents hydrogen,
R$_4$ represents hydrogen, C$_1$-C$_4$-alkyl, C$_1$-C$_4$-alkoxy, chlorine or bromine,
R$_2'$ represents —(CH$_2$)$_p$— or —(CH$_2$)$_p$—O—C$_2$H$_4$— and
$p$ represents 2, 3 or 4.

4. Cationic dyestuff according to claim 3, in which
R''', R$^{IV}$ and R$^V$ represent methyl,
R$_4$ represents hydrogen, methyl, methoxy or chlorine and
$p$ represents 2.

5. Cationic dyestuff according to claim 1, characterised in that they correspond to the formula

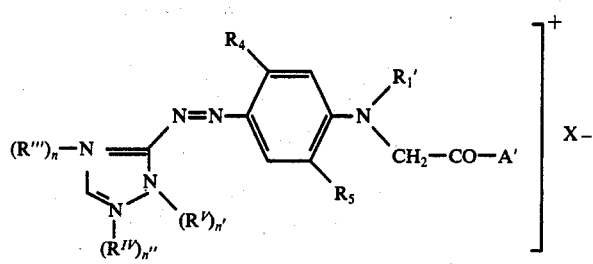

in which
R''', R$^{IV}$, R$^V$, R$_1$', R$_4$, R$_5$, A', X–, n, n' and n" have the meaning indicated in claim 1.

6. Cationic dyestuff according to claim 5, in which

R''', R$^{IV}$ and R$^V$ independently of one another represent methyl, ethyl or benzyl,
R$_5$ represents hydrogen and
R$_4$ represents hydrogen, C$_1$-C$_4$-alkyl, C$_1$-C$_4$-alkoxy, chlorine or bromine.

7. Cationic dyestuff according to claim 6, in which R''', R$^{IV}$ and R$^V$ represent methyl and R$_4$ represents hydrogen, methoxy, chlorine or methyl.

8. Cationic dyestuff according to claim 1 of the formula

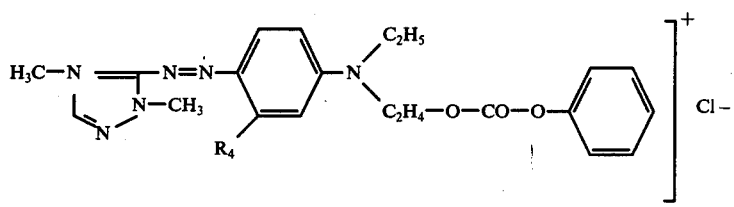

in which
R$_4$ is hydrogen or methoxy.

9. Cationic dyestuff according to claim 1 of the formula

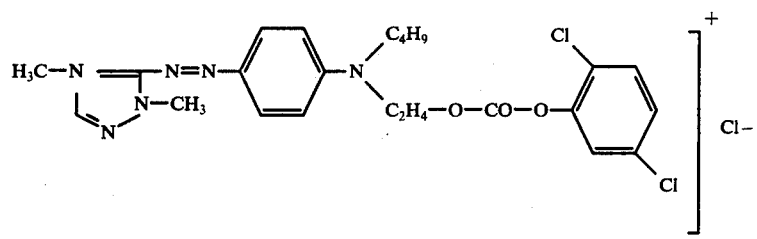

10. Cationic dyestuff according to claim 1 of the formula

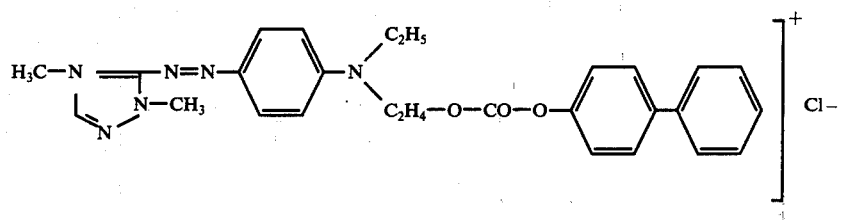

* * * * *